United States Patent
Yamada

(10) Patent No.: US 8,204,308 B2
(45) Date of Patent: Jun. 19, 2012

(54) IMAGE PROCESSING APPARATUS, METHOD, AND PROGRAM

(75) Inventor: Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 12/554,475

(22) Filed: Sep. 4, 2009

(65) Prior Publication Data

US 2010/0061658 A1    Mar. 11, 2010

(30) Foreign Application Priority Data

Sep. 8, 2008 (JP) .................................. P2008-229835

(51) Int. Cl.
*G06K 9/00* (2006.01)

(52) U.S. Cl. ........................................ 382/181; 382/209

(58) Field of Classification Search .......... 382/181–231, 382/103
See application file for complete search history.

(56) References Cited

U.S. PATENT DOCUMENTS

| | | | |
|---|---|---|---|
| 7,085,401 B2 * | 8/2006 | Averbuch et al. | 382/103 |
| 2006/0285747 A1 * | 12/2006 | Blake et al. | 382/180 |
| 2007/0165966 A1 * | 7/2007 | Weiss et al. | 382/284 |
| 2008/0002890 A1 * | 1/2008 | Hu | 382/203 |
| 2008/0198175 A1 * | 8/2008 | Sun et al. | 345/629 |

OTHER PUBLICATIONS

Rother et al.; "GrabCut: Interactive Foreground Extraction Using Iterated Graph Cuts", ACM Transactions on Graphics (SIG-GRAPH'04), 6 sheets, (2004).
Wang et al.; "Optimized Color Sampling for Robust Matting", Computer Vision and Pattern Recognition, pp. 1-8, (2007).

* cited by examiner

*Primary Examiner* — Alex Liew
(74) *Attorney, Agent, or Firm* — Finnegan, Henderson, Farabow, Garrett & Dunner, LLP

(57) ABSTRACT

An image processing apparatus generates a 3-value image from a 2-value image, wherein the first and second values from the 2-value image indicate foreground and background regions of an input image, and the third value indicates an unknown region of predetermined width at the boundary therebetween. A ratio image is generated from the input image and the 3-value image, having a fourth value indicating the ratio of the first value. The 3-value image is updated by defining a predetermined range near a pixel in the 3-value image corresponding to a pixel in the ratio image whose fourth value is greater than a minimum value and less than a maximum value, and then sets all pixels within the defined range to the third value. If the updated 3-value image is determined to be identical or nearly identical to the pre-update 3-value image, then the updated 3-value image is output.

20 Claims, 20 Drawing Sheets

FIG. 15

| INDEX | SIZE |
|---|---|
| 0 | 8 |
| 1 | 7 |
| 2 | 5 |
| 3 | 0 |

IMAGE PROCESSING APPARATUS, METHOD, AND PROGRAM

BACKGROUND OF THE INVENTION

1. Field of the Invention

The present invention relates to an image processing apparatus, method, and program. More particularly, the present invention relates to an image processing apparatus, method, and program whereby a high-quality trimap image (i.e., a 3-value image) can be easily generated from a binary mask image (i.e., a 2-value image).

2. Description of the Related Art

Typical methods for extracting an object in the form of a partial region from a photo or other digital image include the following.

The first method is referred to as image segmentation, and is a method that uses user input to generate a 2-value image (i.e., a binary mask image) separating a foreground object image from a background image. The user first specifies the region he or she wants to cut out by enclosing the boundaries of the foreground object with a rectangle or free lines (lasso tool), or by painting free lines within the foreground object image and the background image regions (scribbles). The specified region is then extracted as a foreground object image.

Graph cuts are another method for extracting a foreground object image. With graph cuts, information input by the user is used to calculate the boundaries of the region constituting the foreground object image to be cut out from the color distributions or pixel color gradients of both the foreground object image and the background image. The foreground object image is then extracted along the calculated boundaries. (See C. Rother, V. Kolmogorov, A. Blake, "GrabCut: Interactive Foreground Extraction using Iterated Graph Cuts," ACM Transactions on Graphics (SIGGRAPH 104), 2004.)

Meanwhile, there exists a second method referred to as alpha matting. With alpha matting, the user respectively specifies a foreground region made up of the foreground object image, a background region made up of the background image, and an unknown region. A 3-value image (trimap image) is then generated having three values each corresponding to one of the respective regions, and an alpha mask image is generated.

An alpha mask image is made up of values (hereinafter also referred to as $\alpha$ values) indicating the transparency $\alpha$ of the foreground object image on a per-pixel basis. In other words, an alpha mask image is a ratio image indicating the transparency ratio of the foreground object image. For example, the transparency may be set to $\alpha=1$ for pixels in regions where the color pattern constituting the foreground object image is 100%, to $\alpha=0$ for regions of 0%, and to $\alpha=0.5$ for intermediate colors of 50%. In so doing, an alpha mask image is created whose pixel values express the transparency $\alpha$. Consequently, an extracted image containing the foreground object image can be generated by multiplying the pixel values of the foreground object image by the transparency $\alpha$ of each pixel in a corresponding alpha mask image.

One method for generating an alpha mask image from a 3-value image as described above is referred to as robust matting. Using a paint tool or similar function, the user generates a trimap image (i.e., a 3-value image). The program then calculates the $\alpha$ values of the unknown regions from the trimap image, using constraint parameters determined from pixel values in the input image, or pixel color values sampled near the boundary of the unknown region. The calculated $\alpha$ values may be $\alpha=1$ for the object and $\alpha=0$ for the background, for example. (See Jue Wang and M. F. Cohen, "Optimized Color Sampling for Robust Matting," Computer Vision and Pattern Recognition, 2007.)

SUMMARY OF THE INVENTION

Since alpha mask images generated by alpha matting can express object boundaries more accurately than binary mask images generated by image segmentation, alpha mask images are better suited to foreground object image extraction.

However, generating a trimap image for input is difficult and labor-intensive for the user, as it involves the user appropriately modifying attributes of the paint tool, such as the brush color and thickness, according to the region.

Furthermore, the quality of the trimap image greatly affects the resulting alpha mask image, and thus it is desirable to specify an accurate unknown region bordering the object boundary as closely as possible.

Summarizing the above, although processing by image segmentation enables separation of the background image and the foreground object image with trivial input work from the user, the result is a binary mask image, and accurate object extraction is questionable.

On the other hand, while alpha mask images generated by alpha matting can yield accurate object extraction, alpha matting involves the user carefully following the contours of the foreground object image and setting brush thicknesses appropriate to particular boundaries. Alpha matting thus involves difficult and labor-intensive input work.

In light of the foregoing, it is particularly desirable to provide means enabling the easy generation of a high-quality trimap (3-value image) from a binary mask image, thereby enabling the easy generation of an alpha mask image by alpha matting the generated 3-value image.

An image processing apparatus in accordance with an embodiment of the present invention includes the following. 3-value image generating means generates a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region. Ratio image generating means generates a ratio image from the input image and the 3-value image, wherein the ratio image is made up of a fourth value that indicates, on a per-pixel basis, the ratio of the first value. Updating means updates the 3-value image by defining a predetermined range near a pixel in the 3-value image that corresponds to a pixel in the ratio image whose fourth value is greater than a minimum value and less than a maximum value, and setting all pixels within the defined range to the third value. Determining means determines whether or not the 3-value image updated by the updating means is identical or nearly identical to the 3-value image before being updated by the updating means. Output means outputs the updated 3-value image if it is determined that the 3-value image updated by the updating means is identical or nearly identical to the 3-value image before being updated by the updating means.

The image processing apparatus may also be configured to further include expansion amount defining means that defines, on a per-pixel basis, a range near a pixel in the 3-value image that corresponds to a pixel in the ratio image whose fourth value is greater than a minimum value and less than a maximum value, the range being defined in the form of an expansion amount. The updating means then updates the 3-value image by setting all pixels within a predetermined range to the third value, the predetermined range being that defined by the expansion amount near a pixel in the 3-value image that corresponds to a pixel in the ratio image whose fourth value is greater than a minimum value and less than a maximum value.

The image processing apparatus may also be configured to further include expansion direction defining means that defines, on a per-pixel basis, a range near a pixel in the 3-value image that corresponds to a pixel in the ratio image whose fourth value is greater than a minimum value and less than a maximum value, the range being defined in the form of an expansion direction. The updating means then updates the 3-value image by setting all pixels within a predetermined range to the third value, the predetermined range being that defined by the expansion direction near a pixel in the 3-value image that corresponds to a pixel in the ratio image whose fourth value is greater than a minimum value and less than a maximum value.

The image processing apparatus may also be configured to further include expansion vector defining means that defines, on a per-pixel basis, a range near a pixel in the 3-value image that corresponds to a pixel in the ratio image whose fourth value is greater than a minimum value and less than a maximum value, the range being defined in the form of an expansion vector made up of an expansion direction and an expansion amount. The updating means then updates the 3-value image by setting all pixels within a predetermined range to the third value, the predetermined range being that defined by the expansion vector near a pixel in the 3-value image that corresponds to a pixel in the ratio image whose fourth value is greater than a minimum value and less than a maximum value.

The image processing apparatus may also be configured such that the expansion direction of the expansion vector includes the orientation of an edge tangent flow vector from the input image or the ratio image, or alternatively, a direction normal to a boundary formed by a pixel taking a predetermined ratio in the ratio image.

The image processing apparatus may also be configured such that, if it is determined that the 3-value image updated by the updating means is identical or nearly identical to the 3-value image before being updated by the updating means, then the ratio image generating means generates a ratio image from the 3-value image updated by the updating means and the input image, wherein the ratio image is made up of a fourth value that indicates, on a per-pixel basis, the ratio of the first value. The updating means then sets all pixels to the third value within a predetermined range near a pixel in the 3-value image that corresponds to a pixel in the ratio image whose fourth value is greater than a minimum value and less than a maximum value.

The image processing apparatus may also be configured such that, until it is determined that the 3-value image updated by the updating means is identical or nearly identical to the 3-value image before being updated by the updating means, the ratio image generating means and the updating means repeat the processing whereby a ratio image is generated from the 3-value image updated by the updating means and the input image, wherein the ratio image is made up of a fourth value that indicates, on a per-pixel basis, the ratio of the first value, and whereby all pixels are set to the third value within a predetermined range near a pixel in the 3-value image that corresponds to a pixel in the ratio image whose fourth value is greater than a minimum value and less than a maximum value.

An image processing method in accordance with another embodiment of the present invention is for an image processing apparatus. The image processing apparatus includes the following. 3-value image generating means generates a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region. Ratio image generating means generates a ratio image from the input image and the 3-value image, wherein the ratio image is made up of a fourth value that indicates, on a per-pixel basis, the ratio of the first value. Updating means updates the 3-value image by defining a predetermined range near a pixel in the 3-value image that corresponds to a pixel in the ratio image whose fourth value is greater than a minimum value and less than a maximum value, and setting all pixels within the defined range to the third value. Determining means determines whether or not the 3-value image updated by the updating means is identical or nearly identical to the 3-value image before being updated by the updating means. Output means outputs the updated 3-value image if it is determined that the 3-value image updated by the updating means is identical or nearly identical to the 3-value image before being updated by the updating means. The image processing method includes the steps of: by means of the 3-value image generating means, generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region; by means of the ratio image generating means, generating a ratio image from the input image and the 3-value image, wherein the ratio image is made up of a fourth value that indicates, on a per-pixel basis, the ratio of the first value; by means of the updating means, updating the 3-value image by defining a predetermined range near a pixel in the 3-value image that corresponds to a pixel in the ratio image whose fourth value is greater than a minimum value and less than a maximum value, and setting all pixels within the defined range to the third value; by means of the determining means, determining whether or not the 3-value image updated by the updating means is identical or nearly identical to the 3-value image before being updated by the updating means; and by means of the output means, outputting the updated 3-value image if it is determined that the 3-value image updated by the updating means is identical or nearly identical to the 3-value image before being updated by the updating means.

A program in accordance with another embodiment of the present invention causes processing to be executed on a computer that controls an image processing apparatus. The image processing apparatus includes the following. 3-value image generating means generates a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region. Ratio image generating means generates a ratio image from the input image and the 3-value image, wherein the ratio image is made up of a fourth value that indicates, on a per-pixel basis, the ratio of the first value. Updating means updates the 3-value image by defining a predetermined range near a pixel in the 3-value image that corresponds to a pixel in the ratio image whose fourth value is greater than a minimum value and less than a maximum value, and setting all pixels within the defined range to the third value. Determining means determines whether or not the 3-value image updated by the updating means is identical or nearly identical to the 3-value image before being updated by the updating means. Output means outputs the updated 3-value image if it is determined that the 3-value image updated by the updating means is identical or nearly identical to the 3-value image before being updated by the updating means. The processing of the program includes the steps of: by means of the 3-value image generating means, generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region; by means of the ratio image generating means, generating a ratio image from the input image and the 3-value image, wherein the ratio image is made up of a fourth value that indicates, on a per-pixel basis, the ratio of the first value; by means of the updating means, updating the 3-value image by defining a predetermined range near a pixel in the 3-value image that corresponds to a pixel in the ratio image whose fourth value is greater than a minimum value and less than a maximum value, and setting all pixels within the defined range to the third value; by means of the determining means, determining whether or not the 3-value image updated by the updating means is identical or nearly identical to the 3-value image before being updated by the updating means; and by means of the output means, outputting the updated 3-value image if it is determined that the 3-value image updated by the updating means is identical or nearly identical to the 3-value image before being updated by the updating means.

According to an embodiment of the present invention, a 3-value image made up of first through third values is generated from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region. A ratio image is then generated from the input image and the 3-value image, wherein the ratio image is made up of a fourth value that indicates, on a per-pixel basis, the ratio of the first value. The 3-value image is then updated by defining a predetermined range near a pixel in the 3-value image that corresponds to a pixel in the ratio image whose fourth value is greater than a minimum value and less than a maximum value, and setting all pixels within the defined range to the third value. It is then determined whether or not the updated 3-value image is identical or nearly identical to the 3-value image before being updated. If it is determined that the updated 3-value image is identical or nearly identical to the 3-value image before being updated, then the updated 3-value image is output.

The image processing apparatus in accordance with an embodiment of the present invention may be an independent device, or a block that conducts image processing.

According to an embodiment of the present invention, it becomes possible to easily generate a high-quality trimap image (i.e., 3-value image) from a binary mask image, while in addition, it becomes possible to easily generate an accurate alpha mask image by alpha matting the generated 3-value image.

BRIEF DESCRIPTION OF THE DRAWINGS

FIG. 15 is a diagram explaining a size array;

DESCRIPTION OF THE PREFERRED EMBODIMENTS

[Exemplary Configuration of Image Processing Apparatus]

Figure 1:
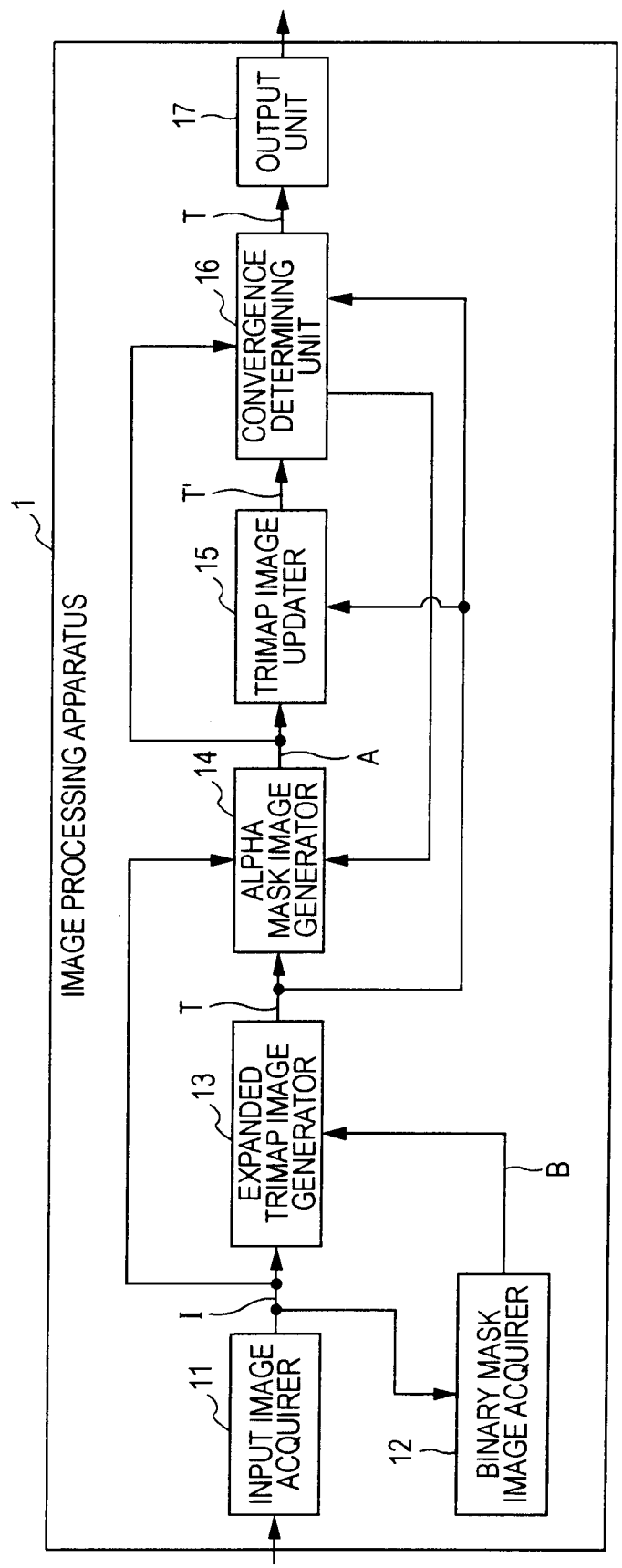
FIG. 1 is a block diagram illustrating an exemplary configuration of an image processing apparatus to which an embodiment of the present invention has been applied.

FIG. 1 illustrates an exemplary configuration of an image processing apparatus to which an embodiment of the present invention has been applied.

In the image processing apparatus 1 shown in FIG. 1, the user simply specifies a foreground object image to be extracted and a background image with respect to an input image. In so doing, the image processing apparatus 1 is able to easily generate a trimap image for generating an alpha mask image (i.e., a ratio image indicating the transparency ratio of the foreground object image) used in the extraction of the foreground object image.

The image processing apparatus 1 includes an input image acquirer 11, a binary mask image generator 12, an expanded trimap image generator 13, an alpha mask image generator 14, a trimap image updater 15, a convergence determining unit 16, and an output unit 17.

The input image acquirer 11 acquires an input image I containing the foreground object image to be extracted, and supplies the input image I to the binary mask image generator 12, the expanded trimap image generator 13, and the alpha mask image generator 14.

The binary mask image generator 12 generates a binary mask image B from the input image I supplied by the input image acquirer 11. For example, the binary mask image generator 12 may extract the foreground object image by means of graph cuts or similar object extraction technology. The binary mask image B thus generated is supplied to the expanded trimap image generator 13.

Figure 2:
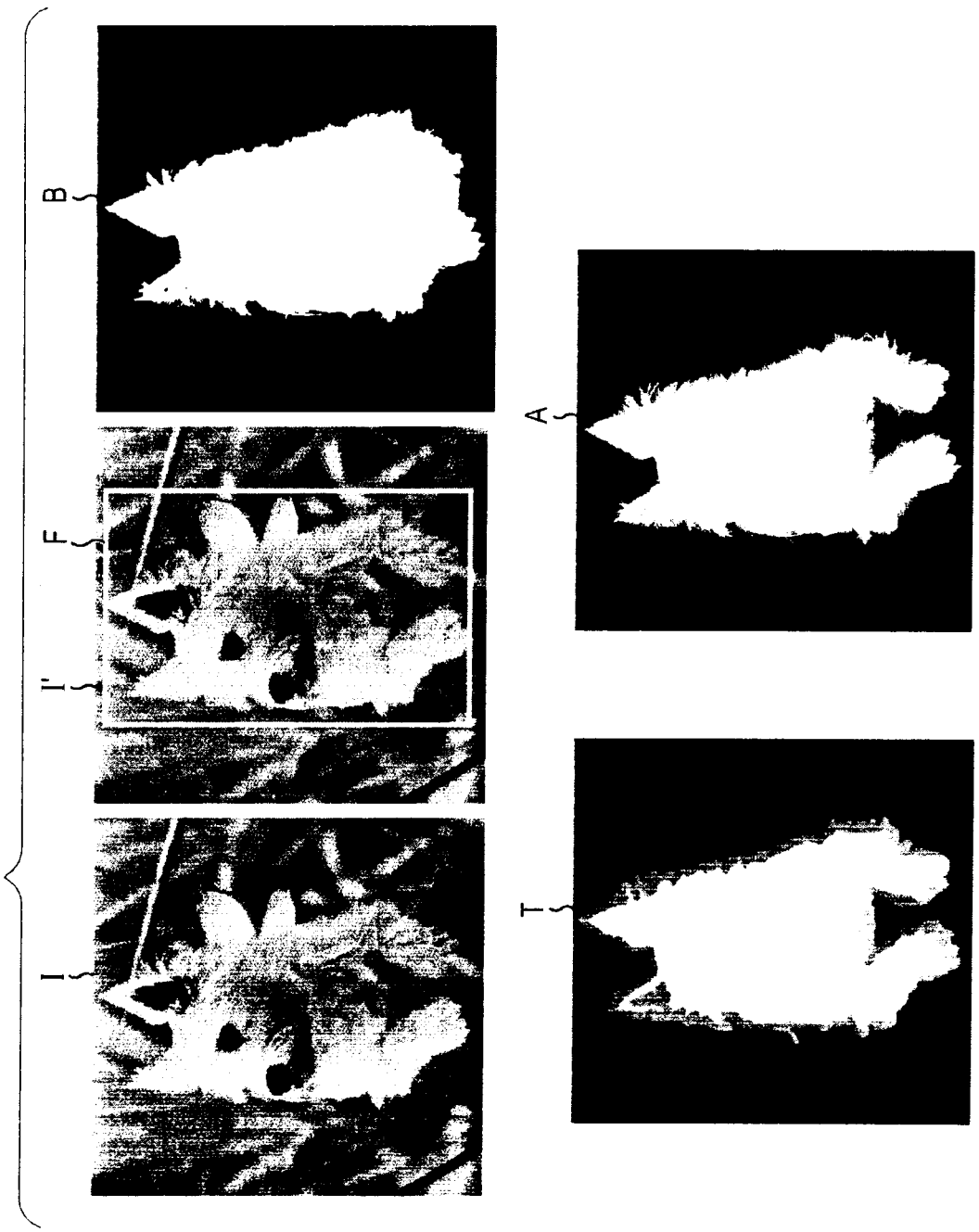
FIG. 2 is a diagram for explaining a process for generating an alpha mask image from an input image.

More specifically, as shown by way of example in FIG. 2, the foreground object image to be extracted from the input image I is selected using a rectangular frame F or similar tool, as indicated by the image I'.

In the input image I, herein, the image of a puppy within the frame F is selected as the foreground object image, while the range outside the frame F is selected as the background image. When graph cuts are applied to the above input image I', the binary mask image generator 12 uses sampled colors in the foreground object image and the background image as a basis for separating out the foreground object image using statistical information (i.e., distribution bias).

In other words, the binary mask image generator 12 conducts separation so as to draw boundaries between the foreground object image and the background image at the edge portions within the frame F in the input image I'. As a result, pixels are labeled 1 or 0 in association with the foreground object image or the background image, respectively. For example, the binary mask image generator 12 may make pixel values in the foreground object image region labeled 1 white, while making all other pixels labeled 0 black. By means of such processing, the binary mask image generator 12 generates a binary mask image B like that shown in the upper-right part of FIG. 2.

From the input image I and the binary mask image B, the expanded trimap image generator 13 sets an unknown region of predetermined width at the boundary between the foreground object image and the background image. In other words, the expanded trimap image generator 13 defines a band of width equal to a predetermined number of pixels along the boundary between the region constituting the foreground object image and the region constituting the background image. The expanded trimap image generator 13 the sets the pixels in the region forming the band to be unknown pixels. In so doing, a trimap image T is generated, being made up of three types of pixels: pixels belonging to the foreground object image (label=1), pixels belonging to the background image (label=0), and unknown pixels (label=−1).

In other words, the expanded trimap image generator 13 generates a trimap image T made up of three pixel values, as shown by way of example in the lower-left part of FIG. 2. The trimap image T is then supplied to the alpha mask image generator 14. In the trimap image T shown in FIG. 2, pixel values are set to white (i.e., the maximum pixel value) in the foreground object image region labeled 1. Pixel values are set to black (i.e., the minimum pixel value) in the background image region labeled 0. Pixel values are set to gray (i.e., an intermediate pixel value) in the unknown region labeled −1. The expanded trimap image generator 13 then supplies the trimap image T thus generated to the alpha mask image generator 14 and the convergence determining unit 16.

In the initial process, the alpha mask image generator 14 acquires the trimap image T from the expanded trimap image generator 13. In subsequent processes after the first, the alpha mask image generator 14 acquires a trimap image T supplied by the convergence determining unit 16.

The alpha mask image generator 14 applies robust matting (see Wang et al.) to the trimap image T, for example, generates an alpha mask image A like that shown in the lower-right part of FIG. 2, and supplies the alpha mask image A to the trimap image updater 15 and the convergence determining unit 16. In the alpha mask image A, the per-pixel transparency of the foreground object image is expressed as $\alpha=1$, the transparency of the background image is expressed as $\alpha=0$, and the transparency of pixels intermediate between the above is expressed as $\alpha$, where $0 \leq \alpha \leq 1$.

More particularly, the puppy represented in the foreground object image shown in FIG. 2 has a long coat of fur, with the fur portions being the boundary with background region. For this reason, pixels near the boundary between the foreground object image and the background image contain mixed colors from both the fur of the puppy in the foreground object region and the background image. Thus, in many cases the transparency $\alpha$ takes a value such that $0<\alpha<1$ for pixels near the boundary. Consequently, among the blend ratios for the pixels at the boundary regions in the input image, the transparency $\alpha$ can be taken to be the blend ratio of color in the foreground object image.

The trimap image updater 15 generates a trimap image T' by defining pixels with a transparency $\alpha$ of $0<\alpha<1$ and nearby pixels in the alpha mask image A to be pixels in the unknown region. The trimap image updater 15 then supplies this newly-generated trimap image T' to the convergence determining unit 16 as the updated result of the trimap image T. A detailed configuration of the trimap image updater 15 will be later described with reference to FIG. 3.

The convergence determining unit 16 compares the trimap image T before being updated by the trimap image updater 15 to the trimap image T' updated by the trimap image updater 15, and determines whether or not the images are identical (or nearly identical). In further detail, the convergence determining unit 16 determines whether or not the distribution of foreground object image, unknown pixels, and background image match in the pre-update trimap image T and the post-updated trimap image T'. If the images do not match or nearly match, then the convergence determining unit 16 supplies the determination results to the alpha mask image generator 14, together with the trimap image T', now set as the trimap image T. In contrast, if it is determined that the images are identical, then the convergence determining unit 16 supplies the alpha mask image A derived by robust matting of the trimap image T' to the output unit 17, together with the trimap image T', now set as the trimap image T.

The output unit 17 outputs the trimap image T supplied by the convergence determining unit 16 and the alpha mask image A derived by robust matting of the trimap image T (or T') as the process results.

In other words, by multiplying each pixel in the input image I by the values of the binary mask image B, the image of the puppy can be extracted as the foreground object image. However, if a foreground object image is extracted using such a technique, the fur portions at the outer edges of the puppy constituting the foreground object image will contain color bleed from the original background image. Thus, the extracted foreground object image will appear unnatural if combined with another image, for example.

Consequently, the image processing apparatus 1 causes an alpha mask image A to be generated from a trimap image T using robust matting, and then a trimap image T' is repeatedly derived from the generated alpha mask image A. The image processing apparatus 1 repeats similar processing until the trimap images T and T, become identical or nearly identical, and the variance in the trimap images T and T' converges. In so doing, a suitable trimap image is derived, as well as an optimal corresponding alpha mask image.

[Exemplary Configuration of Trimap Image Updater]

Figure 3:
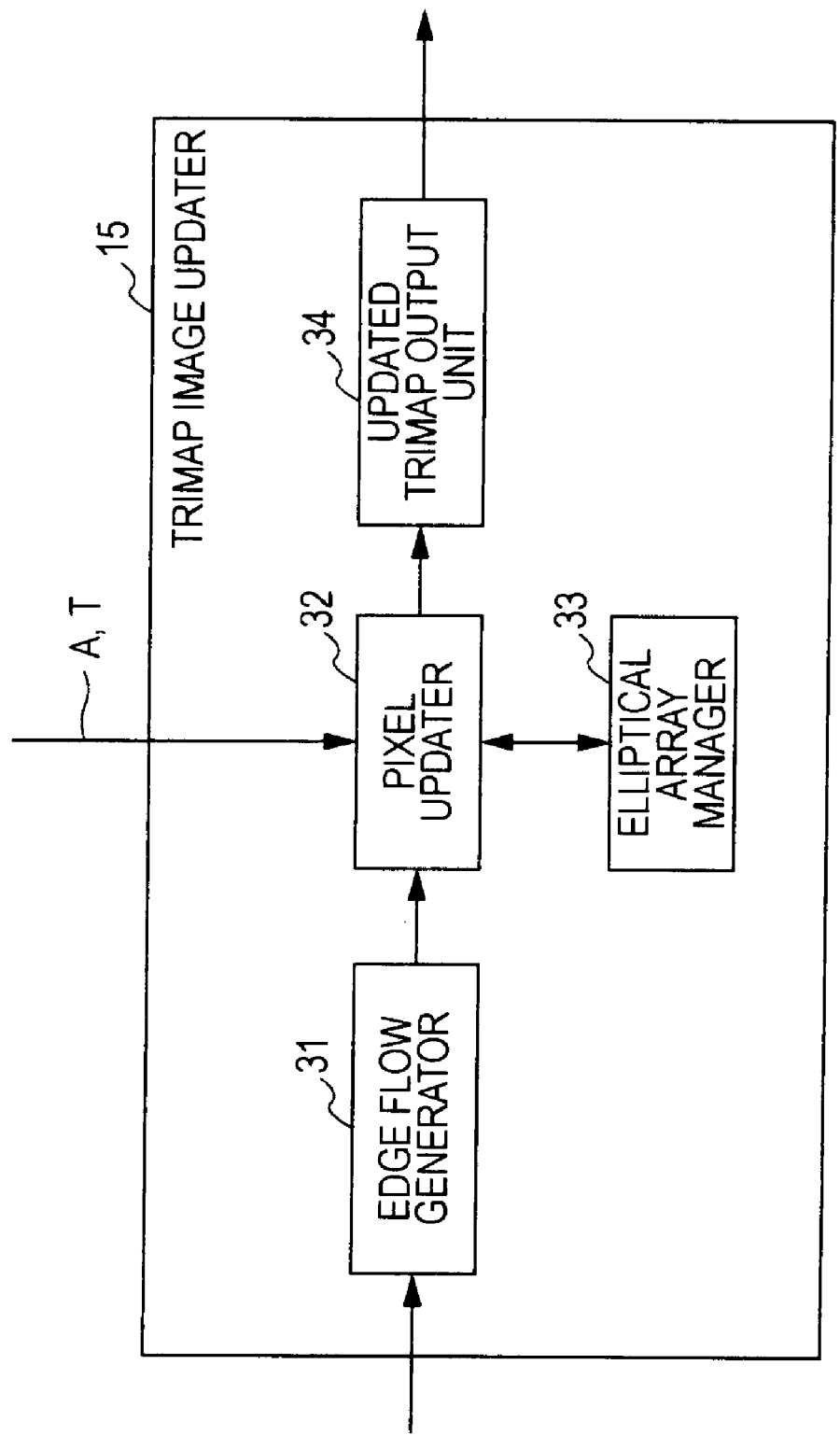
FIG. 3 is a block diagram illustrating an exemplary configuration of the trimap image updater in FIG. 1.

An exemplary configuration of the trimap image updater 15 will now be described in detail and with reference to FIG. 3.

The trimap image updater 15 includes an edge flow generator 31, a pixel updater 32, an elliptical array manager 33, and an updated trimap image output unit 34. By means of such a configuration, the trimap image updater 15 updates the trimap image T by generating a trimap image T' from the alpha mask image A and the trimap image T.

The edge flow generator 31 calculates per-pixel edge flow vectors in a two-dimensional space derived from the intensity of each pixel. The calculated edge flow vectors are then supplied to the pixel updater 32 and the elliptical array manager 33. An edge flow vector is a two-dimensional vector (tx, ty) expressing the direction of an individual pixel. In further detail, an edge flow vector is made up of three parameters set for an individual pixel: a normalized vector (tx, ty), and a vector magnitude. Herein, a normalized vector refers to a vector of magnitude 1. Edge flow vectors express the direction (i.e., the flow) of salient edges in an image, and smoothly vary among adjacent pixels, excepting locations where angles or lines in the image intersect. However, edge flow vectors are undefined for the flat sections of an image, and thus a zero vector may be defined, or nearby vectors may be copied as appropriate. A detailed configuration of the edge flow generator 31 will be later described with reference to FIG. 4.

The pixel updater 32 defines a predetermined ellipse set by the edge flow vectors and centered on a pixel in the alpha mask image A having a transparency α of 0<α<1, and thus belonging to neither the foreground object image nor the background image. The pixel updater 32 then updates the pixels in the trimap image T within the surrounding range defined by the ellipse, and defines those pixels to be unknown pixels. In further detail, the pixel updater 32 refers to a size array svec set in advance in the elliptical array manager 33 to define an elliptical sampling region for each pixel, and then sets the pixels within the elliptical sampling region to be pixels in the unknown region. In so doing, the pixel updater 32 generates a trimap image T'. The trimap image T, thus generated is output to the updated trimap image output unit 34. A detailed configuration of the pixel updater 32 will be later described with reference to FIG. 5.

In the elliptical array manager 33, a size array svec is defined, associating numbers of pixels to be elliptically sampled with positions for the minor axis of an ellipse. The size array svec is used in the generation of the trimap image T' by the pixel updater 32.

The updated trimap image output unit 34 successively stores information regarding the updated trimap image T' that was processed by pixel updater 32 with reference to the size array svec. Once all pixels have been processed, the information is supplied to the convergence determining unit 16.

[Exemplary Configuration of Edge Flow Generator]

Figure 4:
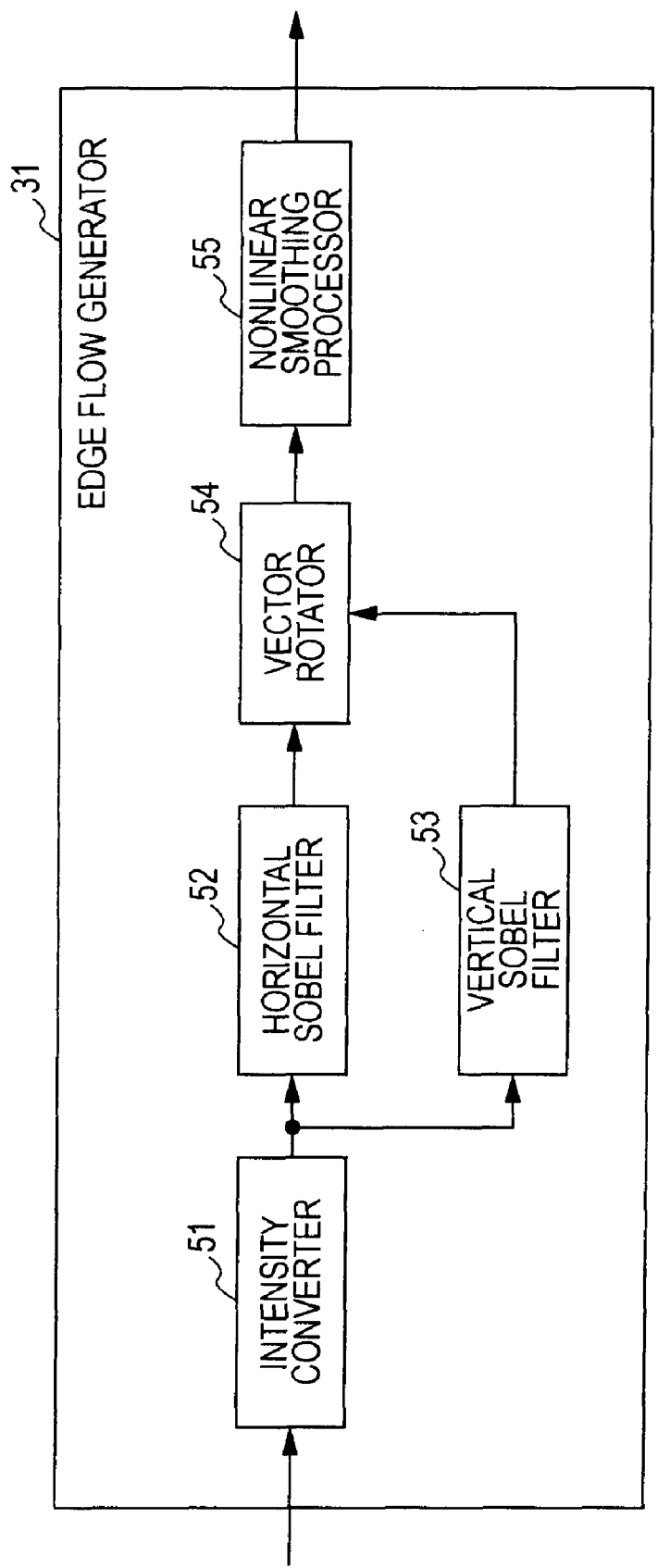
FIG. 4 is a block diagram illustrating an exemplary configuration of the edge flow generator in FIG. 3.

An exemplary, detailed configuration of the edge flow generator 31 will now be described with reference to FIG. 4.

The edge flow generator 31 includes an intensity converter 51, a horizontal Sobel filter 52, a vertical Sobel filter 53, a vector rotator 54, and a non-linear smoothing processor 55. The edge flow generator 31 derives edge flow vectors from the alpha mask image A.

The intensity converter 51 converts the alpha mask image A into an intensity image, and supplies the result to the horizontal Sobel filter 52 and the vertical Sobel filter 53. The horizontal Sobel filter 52 applies Sobel filter processing in order to detect horizontal edges at individual pixels in the intensity image, and then supplies the per-pixel detection results to the vector rotator 54. The vertical Sobel filter 53 applies Sobel filter processing in order to detect vertical edges at individual pixels in the intensity image, and then supplies the per-pixel detection results to the vector rotator 54.

On the basis of the per-pixel filtering results from the horizontal Sobel filter 52 and the vertical Sobel filter 53, the vector rotator 54 constructs edge flow vectors and rotates them 90° clockwise. At this point, the per-pixel filtering results from the horizontal Sobel filter 52 and the vertical Sobel filter 53 are evaluated as differential vectors perpendicular to the edges. Strictly speaking, information regarding the normalized versions and magnitudes of these differential vectors perpendicular to the edges is referred to as edge gradient flow vectors. In contrast, the vectors in the direction following the edges are, strictly speaking, referred to as edge tangent flow vectors. In other words, the edge gradient flow vectors and the edge tangent flow vectors are orthogonal.

For this reason, the vector rotator 54 converts the edge gradient flow vectors into edge tangent flow vectors by rotating the edge gradient flow vectors 90° clockwise. Hereinafter, the term "edge flow vectors" is used to refer to edge tangent flow vectors, but it should be appreciated that edge gradient flow vectors may be used instead of edge tangent flow vectors. For further details regarding edge tangent flow vectors, see for example H. Kang, S. Lee, and C. Chui, "Coherent Line Drawing," Proc. ACM Symposium on Non-photorealistic Animation and Rendering, 2007.

The non-linear smoothing processor 55 smoothes the normalized vectors (the edge flow vectors of unit magnitude) in a non-linear manner, such that the vectors vary smoothly from pixel to pixel. The smoothing results are then supplied to the pixel updater 32.

[Exemplary Configuration of Pixel Updater]

Figure 5:
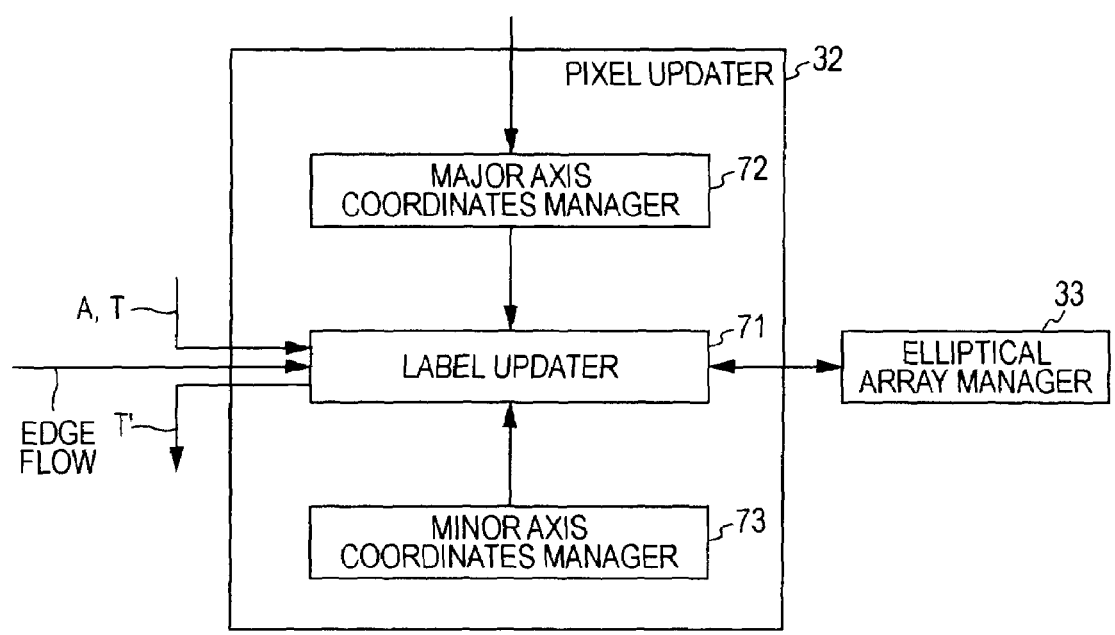
FIG. 5 is a block diagram illustrating an exemplary configuration of the pixel updater in FIG. 3.

An exemplary, detailed configuration of the pixel updater 32 will now be described with reference to FIG. 5.

The pixel updater 32 includes a label updater 71, a major axis coordinates manager 72, and a minor axis coordinates manager 73. The pixel updater 32 updates the trimap image T on the basis of the alpha mask image A, thereby generating a trimap image T'.

On the basis of elliptical array information set on a per-pixel basis and stored in advance in the elliptical array manager 33, the label updater 71 determines whether or not to label a given pixel as an unknown pixel, in accordance with the value of the per-pixel transparency α in the alpha mask image A. Where appropriate, the label updater 71 labels the given pixel, as well as its associated pixels in the set elliptical range, as unknown pixels. The label updater 71 thus applies labels to pixels within the elliptical range while varying the coordinates of the major and minor axes of the ellipse using the major axis coordinates manager 72 and the minor axis coordinates manager 73.

[Trimap Image Generation Process]

A trimap image generation process will now be described with reference to the flowchart shown in FIG. 6.

Figure 7:
FIG. 7 illustrates an exemplary input image.

In step S1, the input image acquirer 11 determines whether or not an input image I has been supplied, and repeats similar processing until an input image is supplied. For example, if an input image I like that shown in FIG. 7 is supplied, the process proceeds to step S2. FIG. 7 illustrates an exemplary image depicting a horse plush toy placed in the center of a desktop. Hereinafter, the image region of the horse plush toy in the input image I is taken to be the foreground object image, and the remainder of the image is treated as the background image.

In step S2, the input image acquirer 11 supplies the input image I that was input above to the binary mask image generator 12, the expanded trimap image generator 13, and the alpha mask image generator 14. The binary mask image generator 12 generates a binary mask image B by separating out the foreground object image using statistical information (i.e., distribution bias) regarding sampled colors in the foreground object image and the background image of the input image I. The generated binary mask image B is supplied to the expanded trimap image generator 13.

Figure 8:
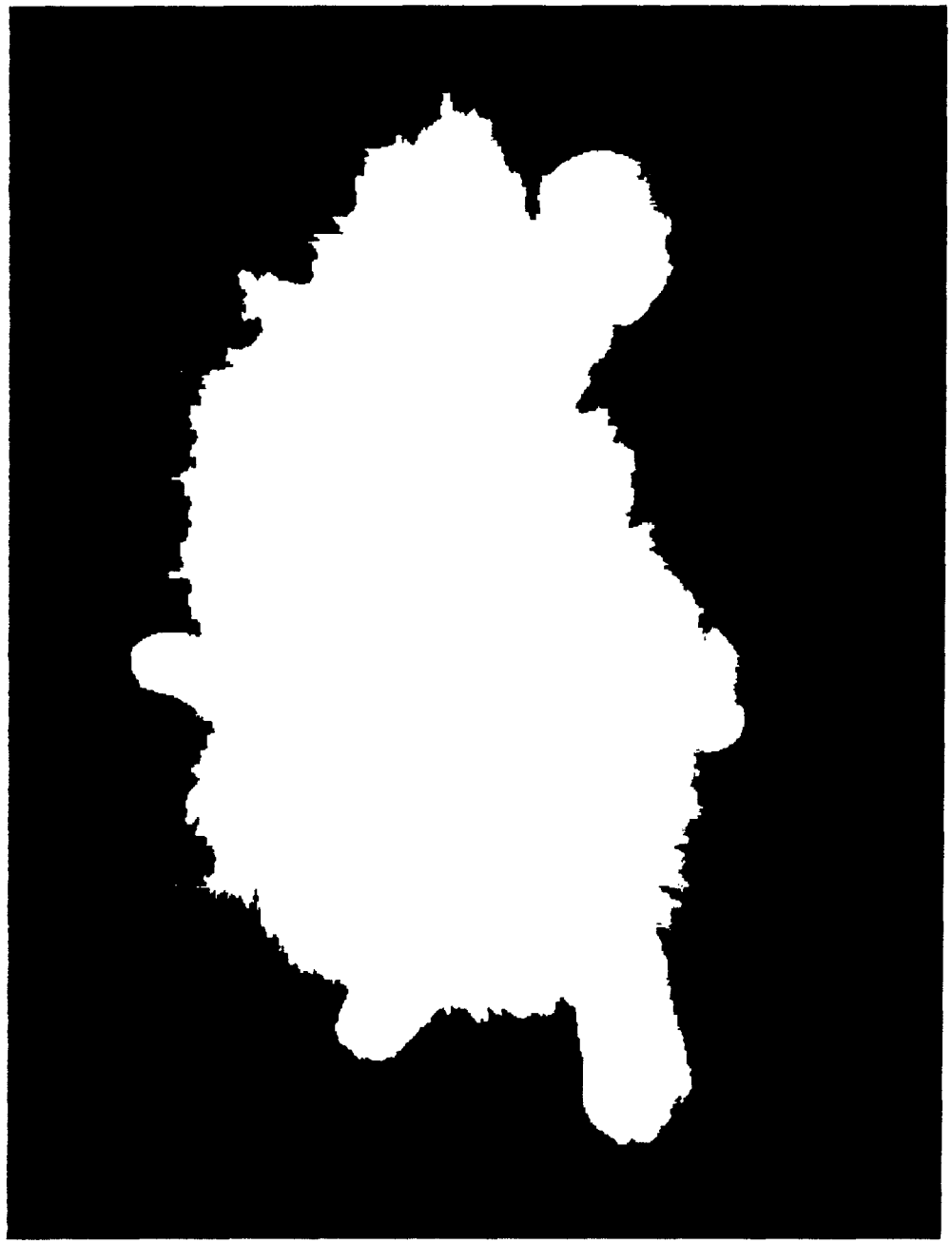
FIG. 8 illustrates an exemplary binary mask image.

More specifically, when given an input image I like that shown in FIG. 7, a binary mask image B like that shown in FIG. 8 is generated when the central horse plush toy is set as the foreground object image. FIG. 8 illustrates an exemplary binary mask image B made up of two values such that the region of the foreground object image is labeled 1, while the region of the background image is labeled 0. In other words, in FIG. 8, an unknown region is not set at the boundary between the foreground object image and the background image.

In step S3, the expanded trimap image generator 13 sets an unknown region of predetermined width near the boundary between the foreground object image and the background image. For example, if the width defining the unknown region is taken to be w (i.e., the width of w pixels), then the expanded trimap image generator 13 applies the label −1 to pixels in the unknown region. The expanded trimap image generator 13 derives the unknown region in a two-stage process wherein all pixels in the binary mask image B are processed in the horizontal direction and the vertical direction.

More specifically, in the first stage, the expanded trimap image generator 13 takes the binary mask image B as input, and then defines a range of w pixels to the left and w pixels to the right of a target pixel to be processed. The expanded trimap image generator 13 then determines whether or not there exists a pixel in the defined range that is labeled differently than the center target pixel. If, for example, there does exist a pixel labeled differently than the target pixel, then the expanded trimap image generator 13 recognizes the target pixel as being contained in the unknown region, and applies the label −1 to the target pixel.

In contrast, if a pixel labeled differently than the target pixel does not exist within the range of w pixels to the left and w pixels to the right of the center target pixel, then the expanded trimap image generator 13 leaves the current label of the target pixel unchanged. As a result, the expanded trimap image generator 13 stores an intermediate trimap image T1 derived by the above horizontal processing.

In the second stage, the expanded trimap image generator 13 takes the intermediate trimap image T1 as input, and then defines a range of w pixels above and w pixels below a target pixel to be processed. Similarly to the horizontal processing, the expanded trimap image generator 13 then determines whether or not there exists a pixel in the defined range that is labeled differently than the center target pixel. If, for example, there does exist a pixel labeled differently than the target pixel, then the expanded trimap image generator 13 recognizes the target pixel as being contained in the unknown region, and applies the label −1 to the target pixel. In so doing, the trimap image T1 is updated, and the trimap image T is generated.

Thus, for each pixel in the binary mask image B, the expanded trimap image generator 13 determines whether or not surrounding pixels are identically labeled within a range of predetermined width 2·w in the horizontal and vertical directions. If the pixels within the range are not identically labeled, then the target pixel in the center of the range is labeled as an unknown pixel. In so doing, a trimap image T like that shown by way of example in FIG. 9 is generated, having an unknown region of predetermined width set near the boundary between the foreground object image and the background image.

Figure 9:
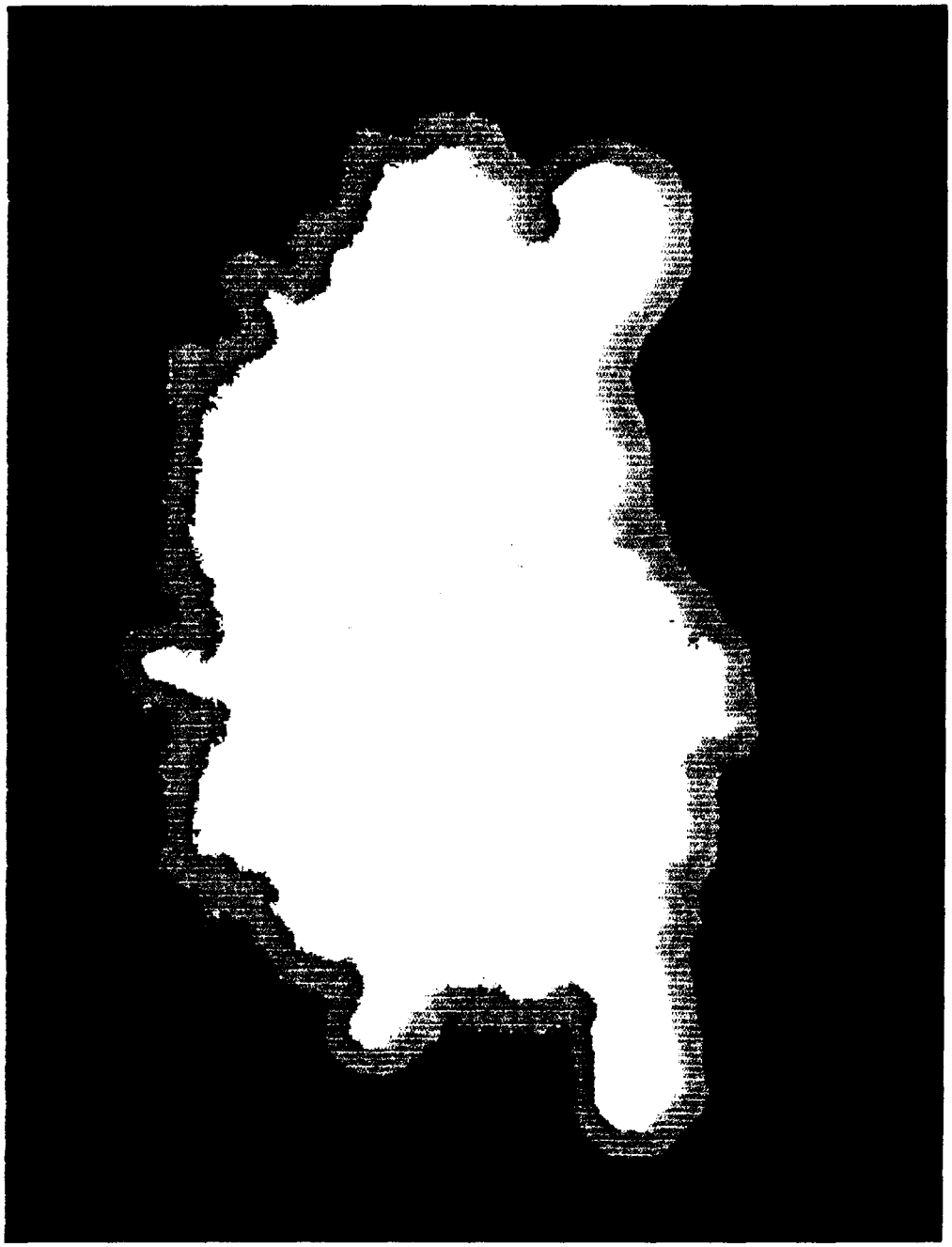
FIG. 9 illustrates an exemplary trimap image.

In the trimap image T shown in FIG. 9, the white (i.e., maximum pixel value) region where labels are equal to 1 is the foreground object image region. The black (i.e., minimum pixel value) region where labels are equal to 0 is the background image region. The gray (i.e., intermediate pixel value) region where labels are equal to −1 is the unknown region. As shown in FIG. 9, the unknown region shown in gray has a nearly uniform width overall.

The expanded trimap image generator 13 supplies such a trimap image T to the alpha mask image generator 14, the trimap image updater 15, and the convergence determining unit 16.

In step S4, the alpha mask image generator 14 uses the trimap image T as a basis for generating an alpha mask image A by robust matting, for example (see Wang et al.). The generated alpha mask image A is supplied to the trimap image updater 15.

In step S5, the trimap image updater 15 updates the trimap image T to the trimap image T', and supplies the result to the convergence determining unit 16.

[Trimap Image Update Process]

A trimap image update process will now be described with reference to the flowchart shown in FIG. 10.

In step S31, the edge flow generator 31 derives an edge flow vector for each pixel, and supplies the results to the pixel updater 32 and the elliptical array manager 33.

[Edge Flow Generation Process]

Figure 11:
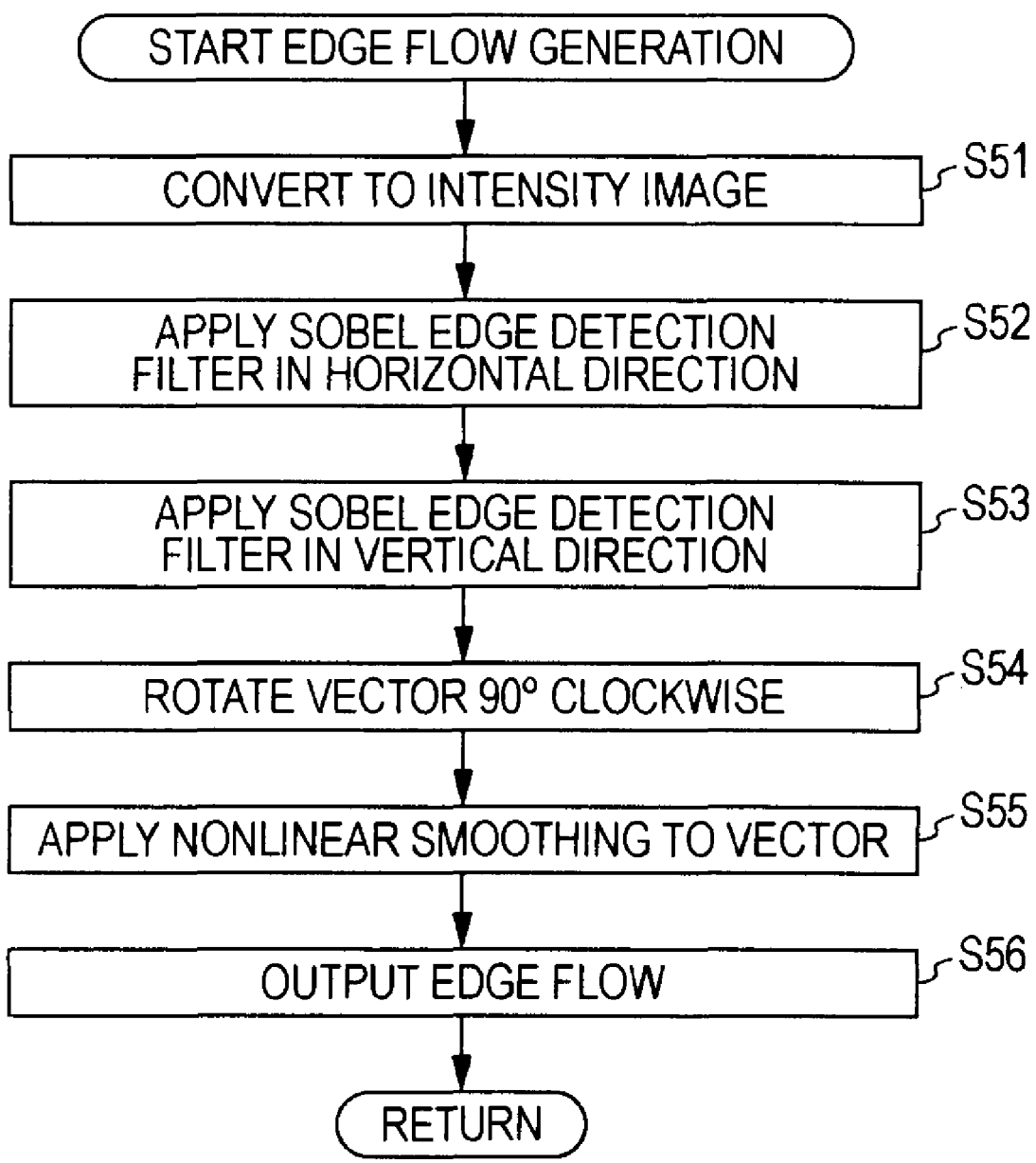
FIG. 11 is a flowchart explaining an edge flow generating process.

An edge flow generation process will now be described with reference to the flowchart shown in FIG. 11.

In step S51, the intensity converter 51 converts the alpha mask image A into an intensity image, and supplies the result to the horizontal Sobel filter 52 and the vertical Sobel filter 53.

In step S52, the horizontal Sobel filter 52 detects edges in the horizontal direction, derives the edge gradient flow perpendicular to the edges in the horizontal direction of the image (i.e., the horizontal component of the differential vectors), and supplies the results to the vector rotator 54.

In step S53, the vertical Sobel filter 53 detects edges in the vertical direction, derives the edge gradient flow perpendicular to the edges in the vertical direction of the image (i.e., the vertical component of the differential vectors), and supplies the results to the vector rotator 54.

In step S54, the vector rotator 54 rotates the edge gradient flow vectors by 90° clockwise to generate edge tangent flow vectors, and supplies the results to the non-linear smoothing processor 55. The edge tangent flow vectors herein are each made up of a horizontal component and a vertical component in the form of normalized vectors (i.e., vectors with a magnitude of 1), as well as information on the vector magnitude. As described earlier, the edge tangent flow vectors are hereinafter simply referred to as edge flow vectors.

In step S55, the non-linear smoothing processor 55 smoothes the edge flow vectors in a non-linear manner, and supplies the smoothed edge flow vectors to the pixel updater 32. In other words, as a result of non-linear smoothing, salient edges are maintained while weak edges are processed so as to follow nearby salient edges, without altering the magnitude of each vector. This results in edge flow vectors whose vector orientations vary smoothly.

Figure 12:
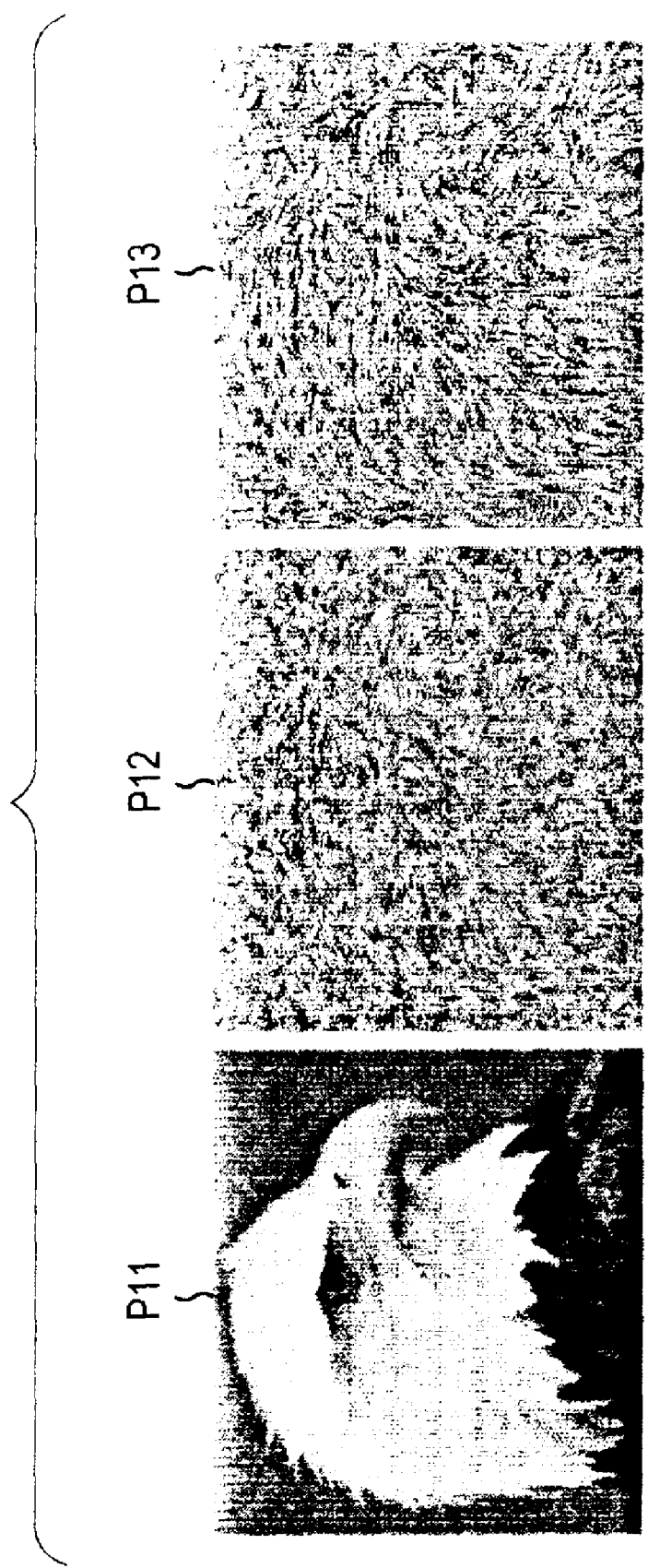
FIG. 12 is a diagram explaining edge flow.

Consider the case wherein the input image is similar to the image P11 shown in FIG. 12, depicting a portrait of a bird and its plumage. In this case, an image of per-pixel edge flow vectors before the application of non-linear smoothing is extracted, similar to the image P12. By applying non-linear smoothing to the image P12 made up of edge flow vectors, an image similar to the image P13 is obtained. In this way, the image depicting the edge flow vectors retains the characteristics of the contours of the bird's plumage, and by applying non-linear smoothing, smoother contours of the plumage are expressed.

By means of the above processing, an edge flow vector is derived for each pixel (px, py), the vector being made up of the normalized vector elements (tx, ty) as well as information regarding the vector magnitude (mag).

Figure 10:
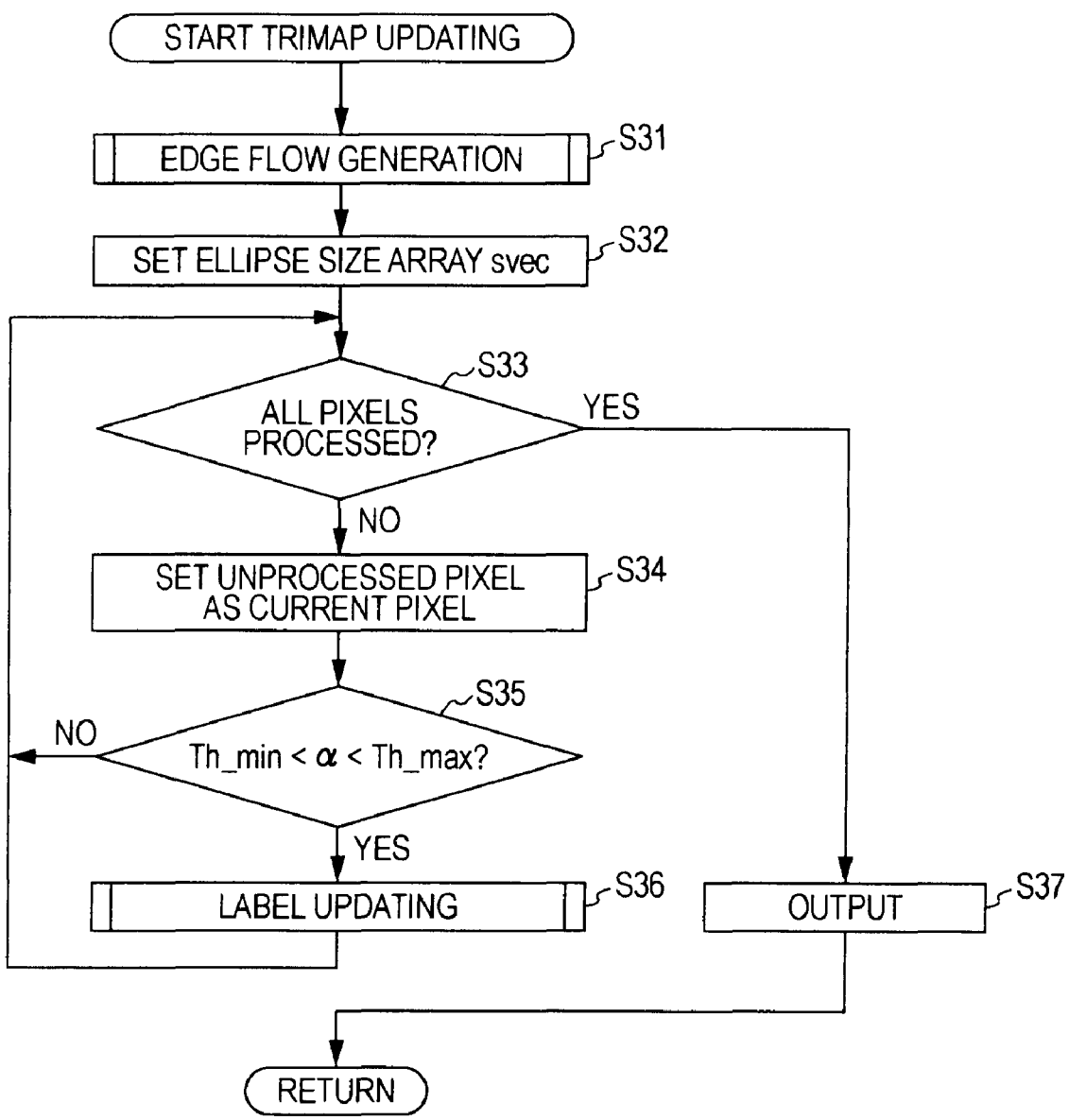
FIG. 10 is a flowchart explaining a trimap image updating process.

The description will now return to the flowchart shown in FIG. 10.

Once the edge flow vectors are derived in step S31, in step S32 the elliptical array manager 33 of the trimap image updater 15 sets a size array svec to be used for elliptical sampling.

Figure 13:
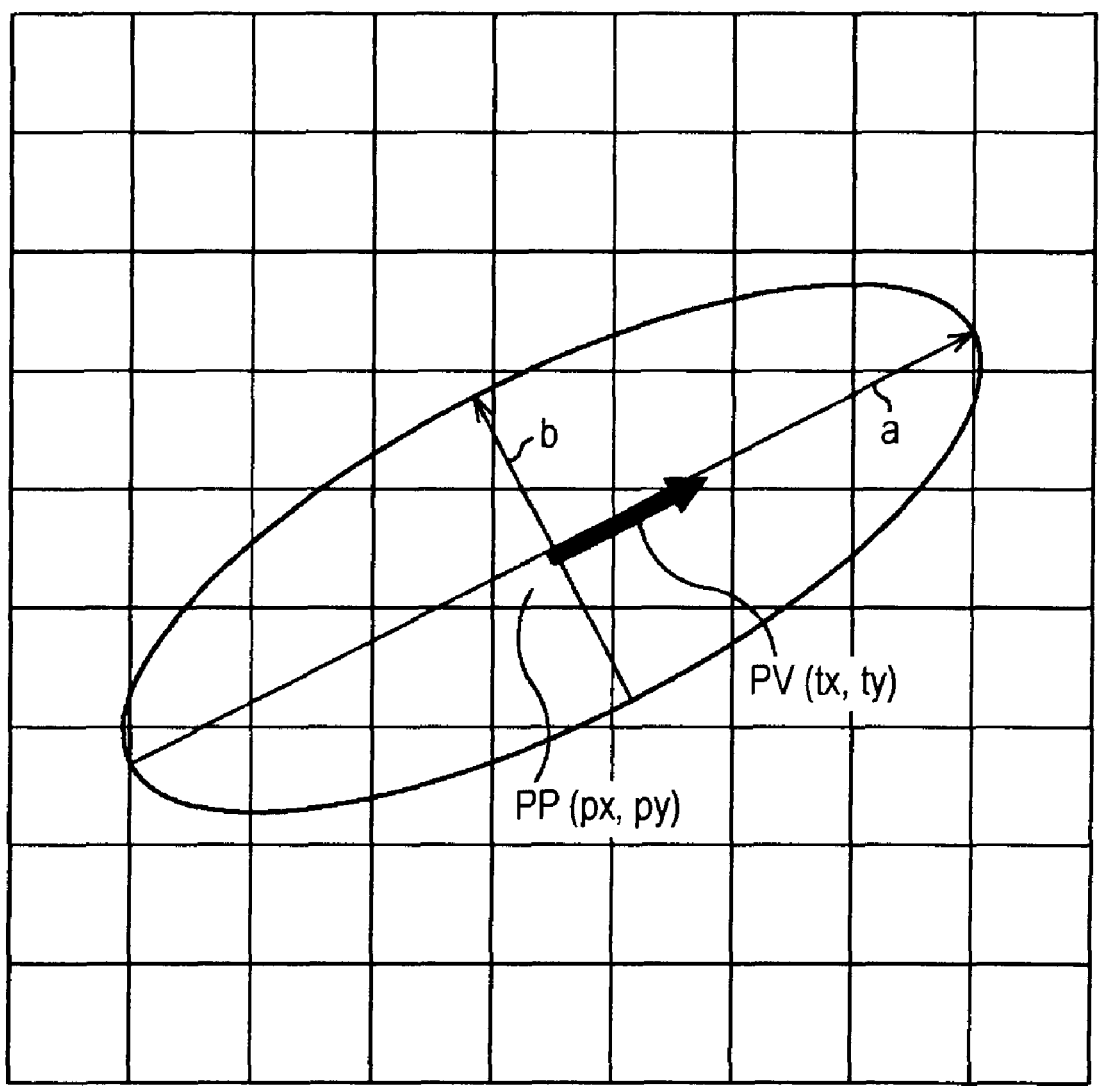
FIG. 13 is a diagram explaining elliptical sampling.

Elliptical sampling may be applied to a pixel as shown in FIG. 13. In FIG. 13, an ellipse is centered on a pixel PP (px, py) of the trimap image T, having a semi-major axis a of length 3·w, a semi-minor axis b of length w, and positioned such that the major axis lies along the edge flow vector (tx, ty) originating from the pixel PP. The elliptical array manager 33 defines the size array svec by calculating in advance the number of pixels to be used as sample points set in the major axis direction in association with positions on the minor axis. The size is calculated according to $$x = \sqrt{((1 - y^2/b^2) \times a^2)} \quad (1)$$

It should be appreciated that the lengths of the major and minor axes as well as other lengths can be freely set.

Figure 14:
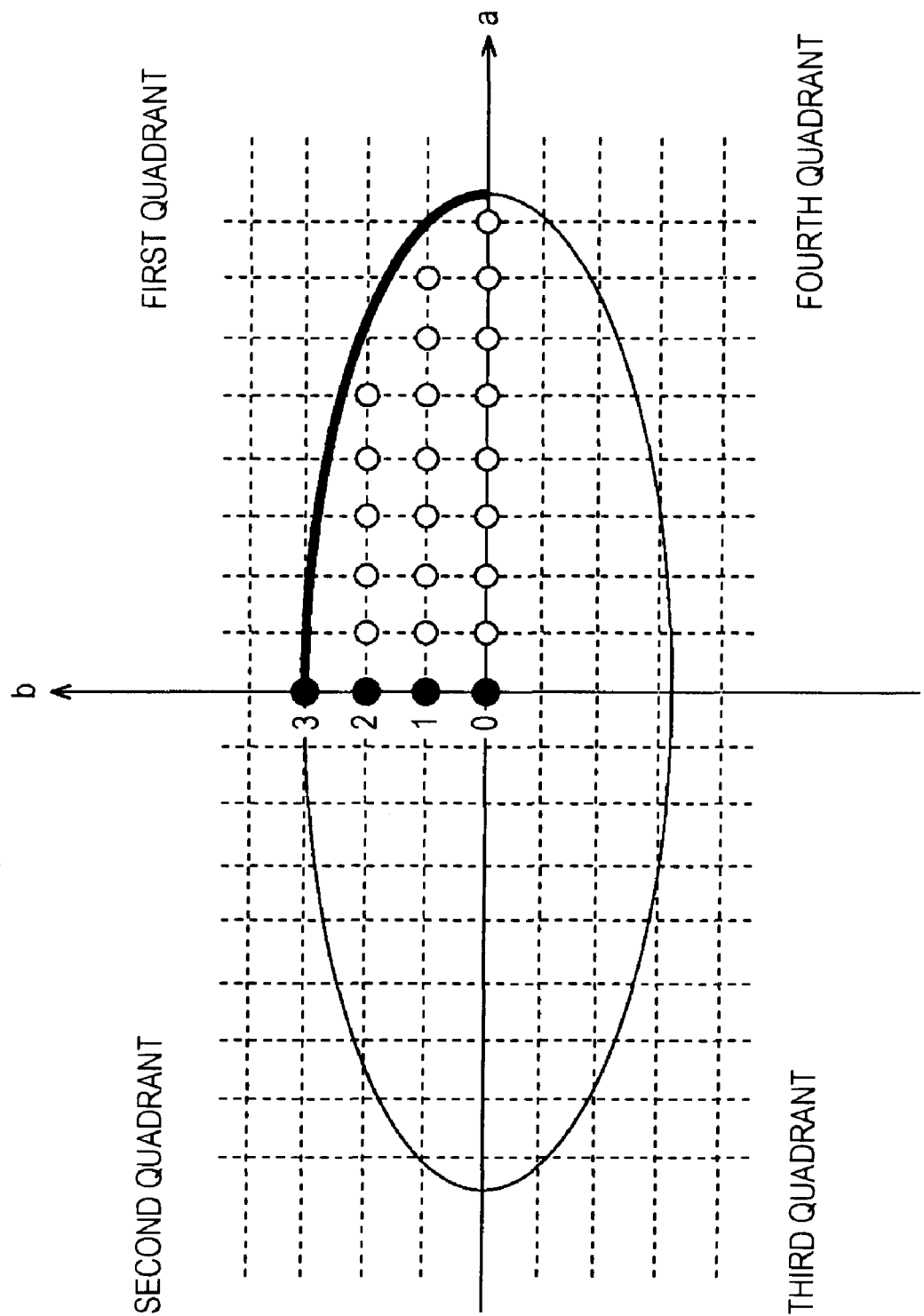
FIG. 14 is a diagram explaining sample points in elliptical sampling.

More specifically, the sample points set in the size array svec are assumed to take integer coordinate positions, as shown by way of example in FIG. 14. Confining discussion to the first quadrant, there exist 8 sample points (indicated by white circles) for an index of 0, which corresponds b=0 on the minor axis, and thus the size becomes 8. Similarly, there exist 7 sample points for an index of 1, which corresponds to b=1 on the minor axis, and thus the size becomes 7. Likewise, there exist 5 sample points for an index of 2, which corresponds to b=2 on the minor axis, and thus the size becomes 5. There exist 0 sample points for an index of 3, which corresponds to b=3 on the minor axis, and thus the size becomes 0.

Figure 15:
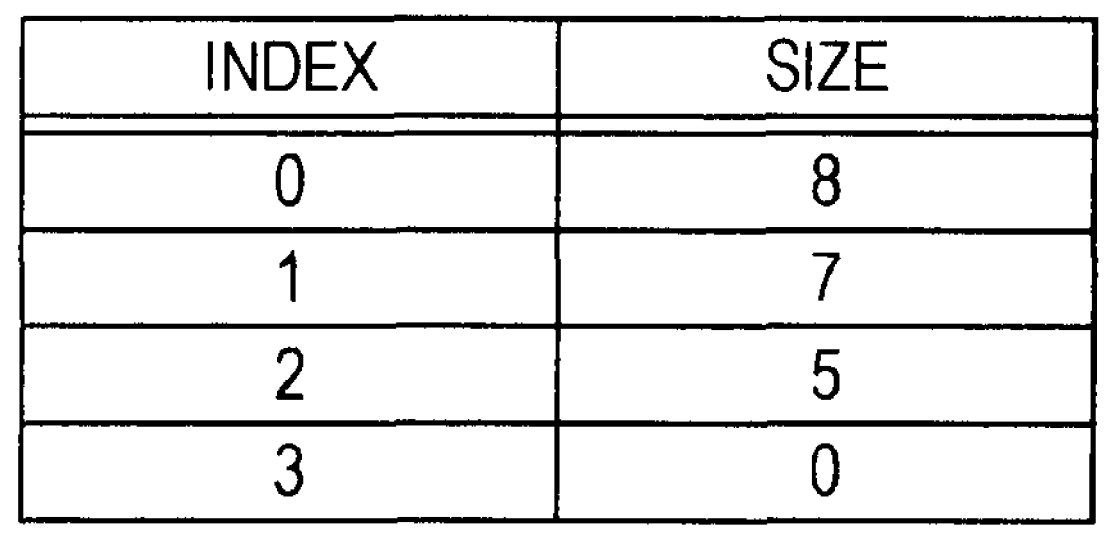

Thus, the elliptical array manager 33 assembles relationships between index values and sizes in the first quadrant, and then defines a size array svec like that shown by way of example in FIG. 15.

In step S33, the pixel updater 32 determines whether or not there exist unprocessed pixels in the alpha mask image A and trimap image T. If, for example, unprocessed pixels do exist, then in step S34 the pixel updater 32 sets the target pixel (px, py) to one of the unprocessed pixels.

In step S35, it is determined whether or not the transparency α of the targeted pixel in the alpha mask image A is greater than a minimum value Th_min, and in addition, whether or not the transparency α is less than a maximum value Th_max. In other words, in step S35, it is determined whether or not the pixel targeted for processing clearly belongs to neither the foreground object image nor the background image.

If, in step S35, the transparency α of the target pixel is greater than the minimum value Th_min and less than the maximum value Th_max (i.e., the pixel belongs to neither the foreground object image nor the background image), then the process proceeds to step S36.

In step S36, the pixel updater 32 updates the labels for all pixels within the elliptical range on the trimap image T specified by the target pixel, and labels the pixels within the range as unknown pixels.

[Label Update Process]

Figure 16:
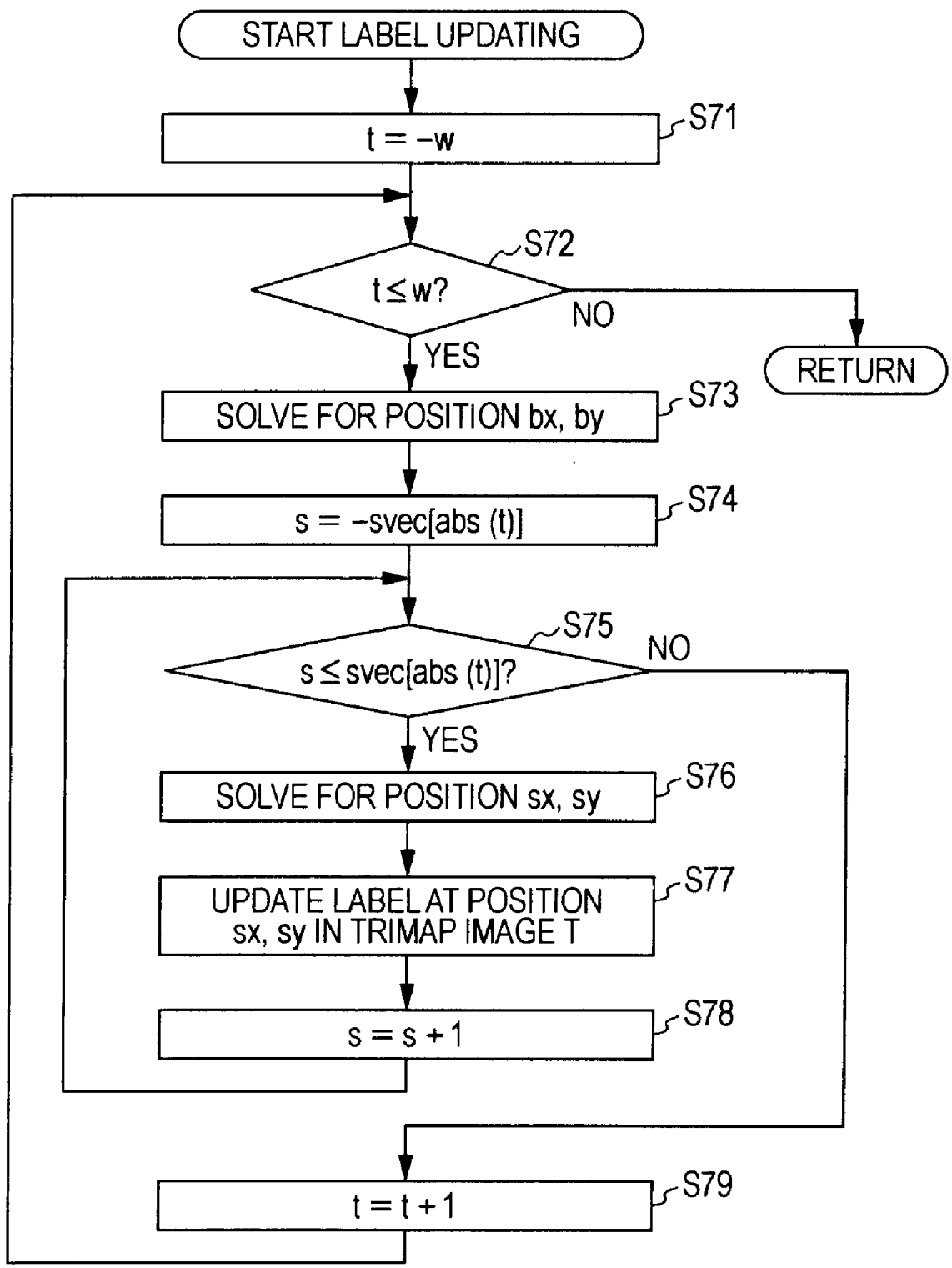
FIG. 16 is a flowchart explaining a label updating process.

A label update process will now be described with reference to the flowchart shown in FIG. 16.

In step S71, the label updater 71 controls the minor axis coordinates manager 73 to set a minor axis counter to the negatively-signed value of the minor axis length w (t=−w).

In step S72, the minor axis coordinates manager 73 determines whether or not the counter t is less than or equal to the minor axis length w. If, for example, the counter t is less than or equal to w, then the process proceeds to step S73.

In step 73, the label updater 71 evaluates $$bx = px + tx \times t$$

$$by = py + ty \times t \quad (2)$$

in order to determine the position (bx, by) of a pixel within the elliptical range that is to be set to an unknown pixel with respect to the target pixel (px, py) in the trimap image T.

Figure 17:
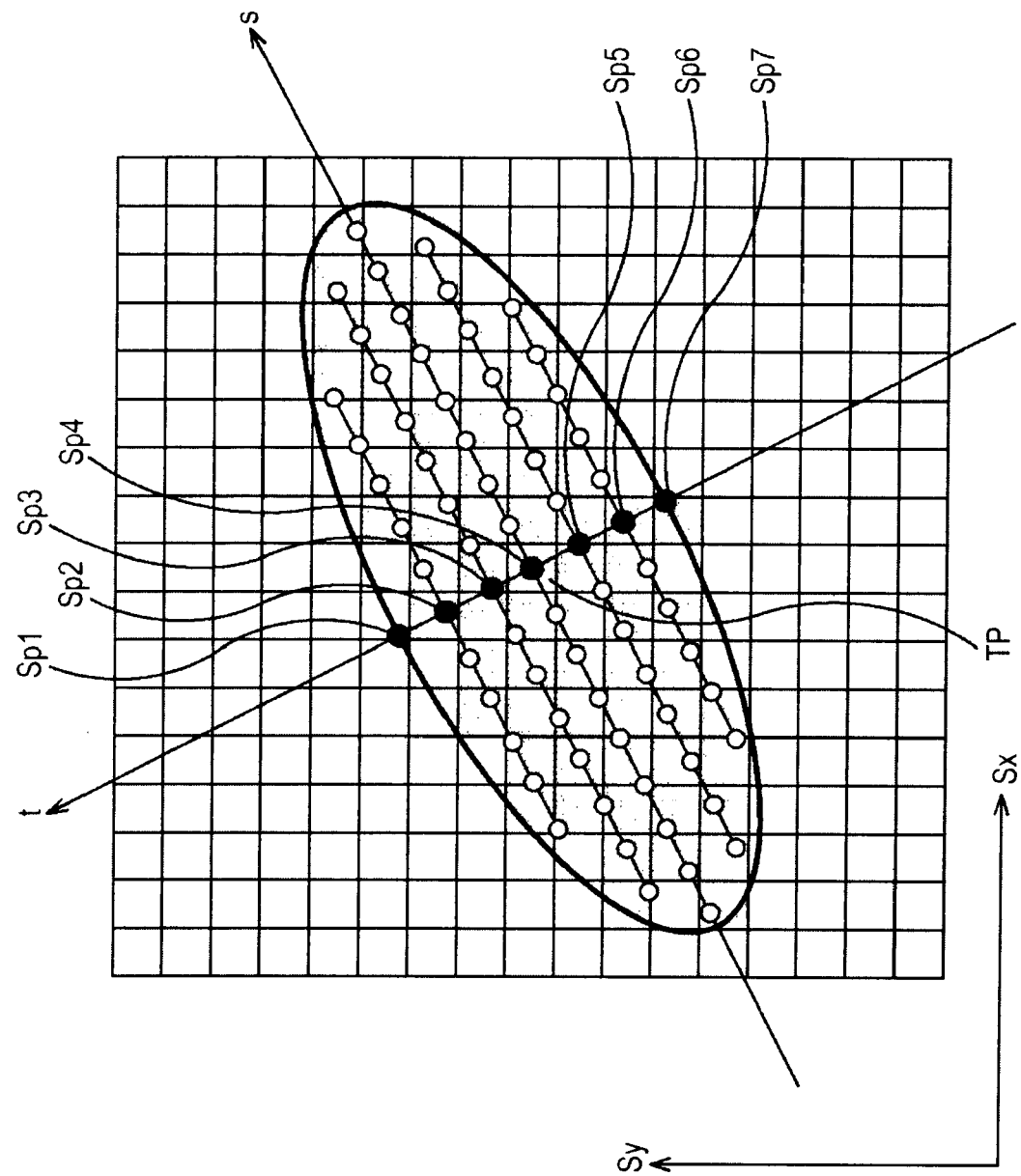
FIG. 17 is a diagram explaining a label updating process.

Herein, bx and by are the coordinates (bx, by) of one of the sample points (black circles) shown by way of example in FIG. 17. The sample points are defined by the target pixel (px, py) and lie on the t-axis within the elliptical range. In addition, tx and ty are the Sx-axis and Sy-axis components of the edge flow vector originating at the target pixel (px, py). In addition, t is the value of the counter t.

In other words, in the processing in step S73, the sample point, following the counter t, successively takes the positions of the sample points Sp7, Sp6, Sp5, Sp4, . . . , and Sp1 shown in FIG. 17. In FIG. 17, the target pixel (px, py) is the pixel TP shown as the square grid unit on the trimap image T to which the sample point Sp4 indicated as a black circle belongs.

In step S74, the major axis coordinates manager 72 access the elliptical array manager 33 for the size array svec stored therein, and reads out the size defined for an index equal to the absolute value of the counter t (svec[abs(t)]). The major axis coordinates manager 72 then applies a negative sign to the read size (svec[abs(t)]), and defines this value to be a counter s. In other words, the negative value of the size corresponding to an index set by the counter t is taken from among the sizes defined along the major axis, and this value is defined as the value of the counter s.

In step S75, the major axis coordinates manager 72 determines whether or not the counter s is less than or equal to the size corresponding to an index equal to the absolute value of the counter t in the size array svec stored in the 33 (svec [abs (t)]).

In other words, the counters s and t respectively indicate coordinates on the s and t axes upon which exist the sample points corresponding to the positions of pixels to be set as unknown pixels (the s and t axes being those of the flow vector (tx, ty)). For this reason, in step S75 it is determined whether or not the counter s is less than or equal to the maximum value within the elliptical range from among the s-axis coordinates of the sample points defined on a line orthogonal to the t-axis (and thus parallel to the s-axis) at a position corresponding to the current counter t, as shown in FIG. 17.

For example, if the counter t is 0, then the size becomes svec[0] for an index of 0, or 8, as shown in FIG. 15. Consequently, it is determined whether or not the counter s has reached the rightmost sample point within the range on the s-axis shown in FIG. 17. In other words, it is determined whether or not the counter s is equal to a coordinate position lying to the left (on the s-axis) of the maximum sample point (s, t)=(8, 0) within the range defined by the ellipse.

If the counter s is smaller than svec[abs(t)] returned by the size array svec in step S75, then the process proceeds to step S76.

In step S76, the formulas $$sx = \text{round}(bx + tx \times s)$$

$$sy = \text{round}(by + ty \times s) \quad (3)$$

are evaluated, for example, to set the target position (sx, sy) within the elliptical range.

Herein, round(X) indicates an operation to discard values of X past the decimal point. The target position (sx, sy) are coordinates for a pixel, indicated as a grid square in FIG. 17, that contains a sample point (i.e., a white circle) defined along the s-axis. In other words, as a result of the processing in step S76, coordinates are determined for a pixel within the (Sx, Sy) space on the trimap image T and corresponding to a sample point within the (s, t) space, as shown in FIG. 17.

In step S77, the label updater 71 labels the pixel in the trimap image T at the coordinate position (sx, sy) corresponding to the sample point (s, t) as −1, which indicates that the pixel is an unknown pixel. The results are output to the updated trimap image output unit 34.

In step S78, the major axis coordinates manager 72 increments the counter s by 1, and the process returns to step S75. In other words, the processing in steps S75 to S78 is repeated until it is determined in step S75 that the counter s is less than or equal to the value of svec[abs(t)] returned by the size array.

In step S75, if it is determined that the counter s is not less than or equal to the value of svec[abs(t)] returned by the size array (i.e., if it is determined that the counter s has exceeded the elliptical range defined by the sample points), then the process proceeds to step S79. In step S79, the minor axis coordinates manager 73 increments the counter t by 1, and the process returns to step S72. The processing in steps S72 to S79 is then repeated until it is determined in step S72 that the counter t is not less than or equal to w.

When it is determined in step S72 that the counter t is not less than or equal to the minor axis length w (i.e., the counter t has exceeded w), the process is terminated.

To summarize the above process, consider the case wherein the pixel targeted for processing on the trimap image T is the pixel TP corresponding to the sample point Sp4 within the elliptical range shown by way of example in FIG. 17. In this case, an ellipse is set as the target range for processing. A sample point on the t-axis is then successively set to the sample points Sp7, Sp6, . . . , Sp1, in that order, by a counter t that manages coordinates on the minor axis. In addition, a sample point on the s-axis corresponding to a position on the t-axis is successively set from left to right. The pixels on the trimap image T to which the set sample points belong (i.e., the pixels indicated as shaded unit squares in FIG. 17) are then updated such that their labels become −1, which indicates that the pixels are unknown pixels.

As a result, a target pixel for processing is selected on the trimap image T, and an elliptical range of predetermined range is then centered about the target pixel such that its major axis is aligned with the orientation of the edge flow vector originating at the target pixel. Pixels existing within this elliptical range are then set as unknown pixels. Consequently, it becomes possible to target a pixel on the trimap image T that does not clearly belong to either the foreground object image or the background image, and then cause the pixels in a surrounding range weighted with respect to the edge flow vector to be set as unknown pixels.

The description will now return to the flowchart shown in FIG. 10.

In step S35, if it is determined that the transparency a of the target pixel in the alpha mask image A is either not greater than the minimum value Th_min or not less than maximum value Th_max, then the processing in step S36 is skipped, and the process returns to step S33. In other words, the processing in step S36 is skipped when a pixel in the alpha mask image belongs to either the foreground object image or the background image.

As a result, the processing in steps S33 to S36 is repeated until it is determined in step S33 that all pixels have been processed. Of the pixels in the alpha mask image A, only those pixels that belong to neither the region of the foreground object image nor the background image are labeled as unknown pixels.

When it is determined in step S33 that all pixels have been processed, the process proceeds to step S37.

In step S37, the updated trimap image output unit 34 supplies the updated trimap image T' stored therein to the convergence determining unit 16.

In other words, pixels in the trimap image T corresponding to pixels in the alpha mask image A that belong to neither the foreground object image nor the background image are updated such that all pixels within elliptical ranges set by the edge flow vectors of respective target pixels are labeled as unknown pixels.

Figure 6:
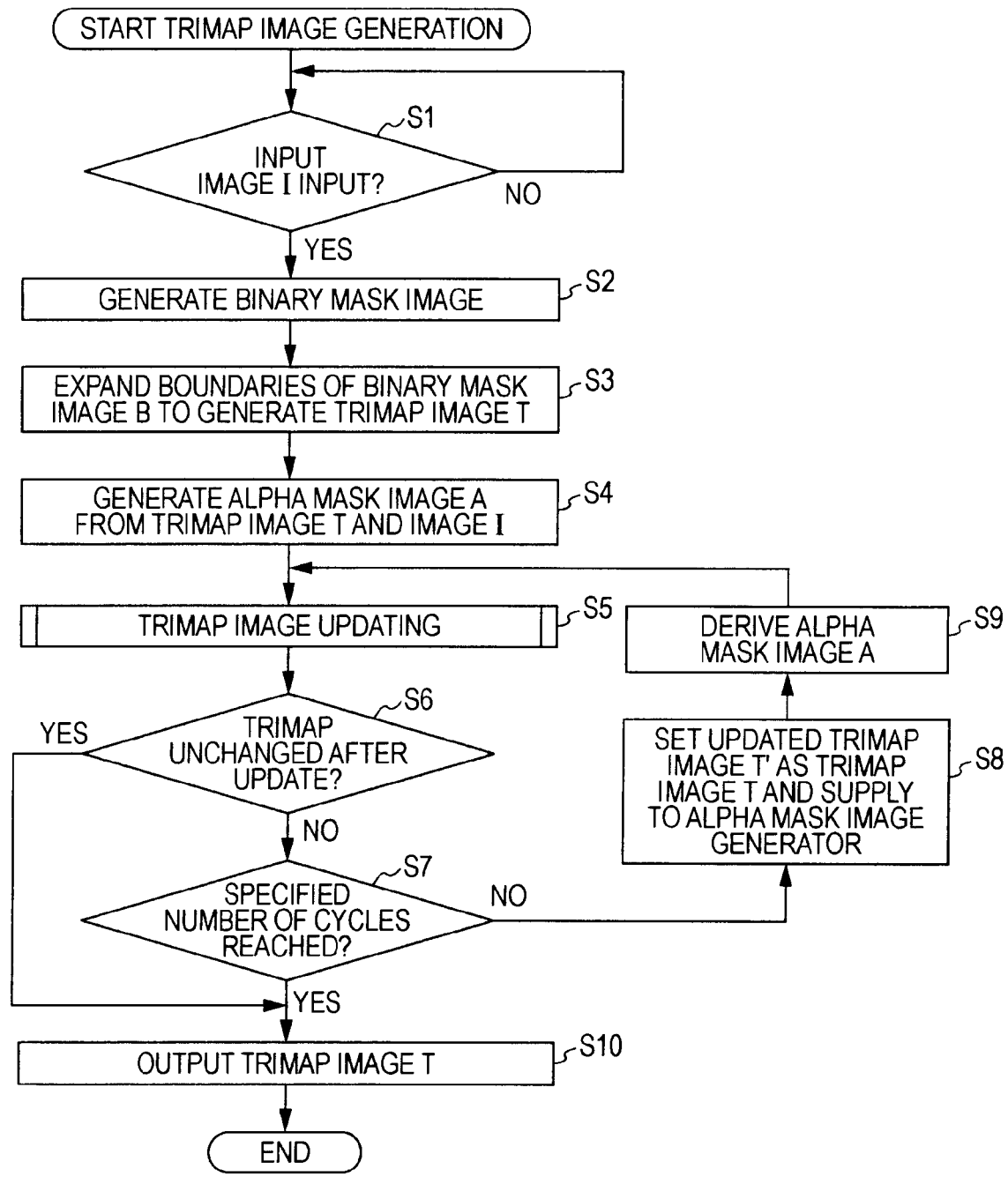
FIG. 6 is a flowchart explaining the first cycle of a trimap image generation process.

The description will now return to the flowchart shown in FIG. 6.

In step S6, the convergence determining unit 16 compares the trimap image T before being updated by the trimap image updater 15 to the trimap image T' that was updated by the trimap image updater 15, and determines whether or not the two images are identical or nearly identical. If, for example, it is determined that the two images are not identical or nearly identical, then the process proceeds to step S7.

In step S7, the convergence determining unit 16 determines whether or not the processing in steps S5 to S7 has been executed a specified number of times. If it is determined that the processing has not been executed the specified number of times, then the process proceeds to step S8.

In step S8, the convergence determining unit 16 stores the updated trimap image T' as the immediately previous trimap image T, and supplies the trimap image T to the alpha mask image generator 14.

In step S9, the alpha mask image generator 14 generates a new alpha mask image A by robust matting of the trimap image T supplied by the convergence determining unit 16. The new alpha mask image A is supplied to the trimap image updater 15, and the process then returns to step S5.

In other words, the processing in steps S5 to S9 is repeated until the trimap image T before being updated by the trimap image updater 15 and the updated trimap image T' become identical or nearly identical to each other, or alternatively, until the processing in steps S5 to S9 has been executed a specified number of times. Furthermore, for each execution after the first, the alpha mask image generator 14 generates an alpha mask image A not from the trimap image T generated by the expanded trimap image generator 13, but instead from the immediately previous updated trimap image T' substituted in as the trimap image T.

Subsequently, after repeating the processing in steps S5 to S9, if it is determined in step S6 that the pre-update trimap image T and the post-update trimap image T, are identical or nearly identical, then the process proceeds to step S10. Alternatively, after repeating the processing in steps S5 to S9, if it is determined in step S7 that the processed in steps S5 to S9 has been executed a specified number of times, then the process similarly proceeds to step S10.

In step S10, the convergence determining unit 16 supplies the trimap image T' to the output unit 17 as the trimap image T. At this point, the convergence determining unit 16 supplies the trimap image to the output unit 17 in combination with the simultaneously-received alpha mask image A. The output unit 17 then outputs the received trimap image T and alpha mask image A.

As a result of the above, processing is repeated to set pixels in the trimap image T as unknown pixels, on the basis of the per-pixel transparency α in the alpha mask image A. The affected pixels are those within a predetermined range defined by an ellipse, and correspond to pixels that belong to neither the foreground object image nor the background image.

The elliptical range initially defined for the elliptical sampling may be small, for example, but by subsequently repeating the above processing, the range within which unknown pixels are defined typically grows larger with each repetition of the trimap image update process.

More specifically, an initial trimap image T corresponding to the input image I shown in FIG. 7 may be like that shown by way of example in FIG. 9, wherein the width of the boundary between the foreground object image and the background image is nearly uniform throughout.

Figure 18:
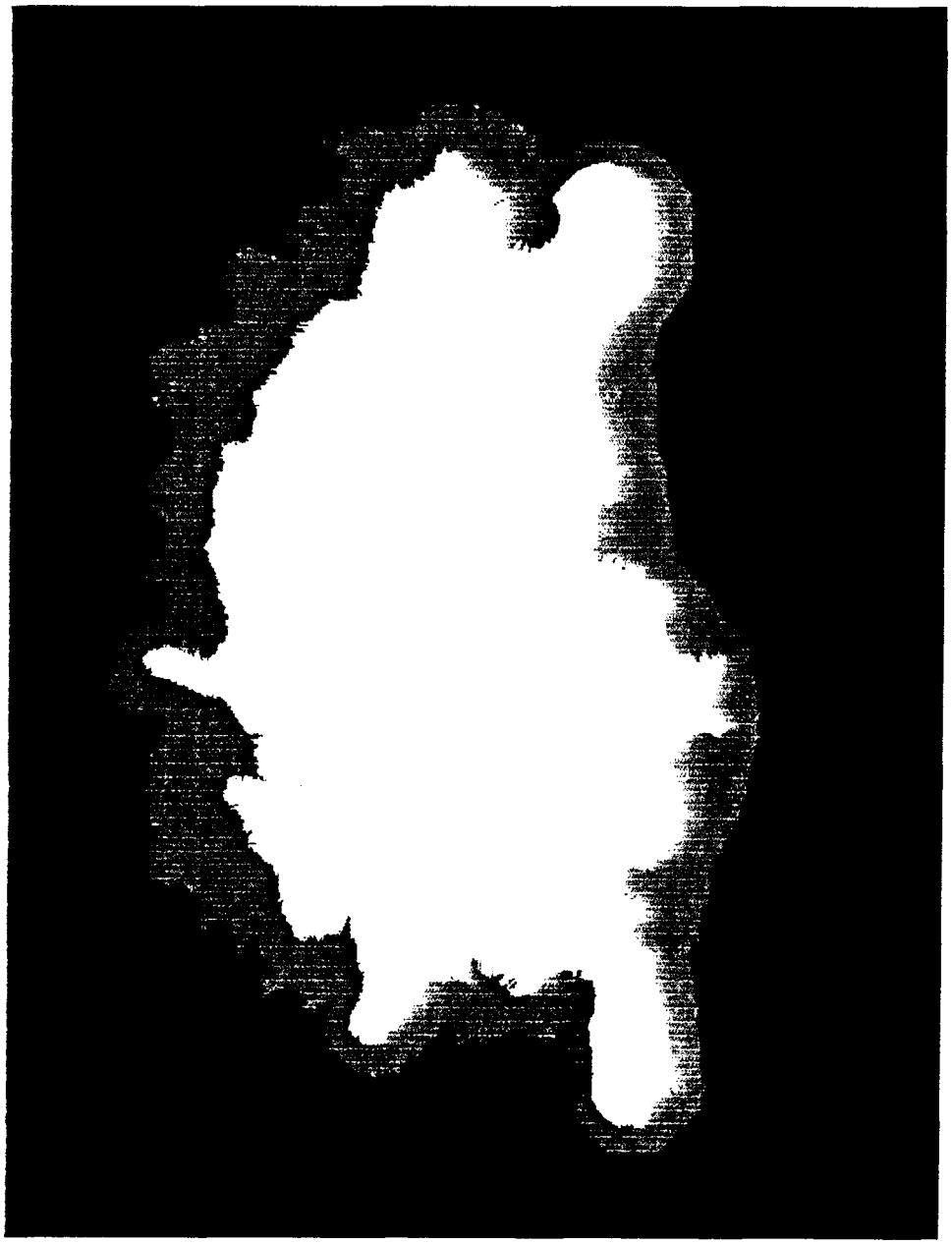
FIG. 18 illustrates an exemplary trimap image after repeated updates.
Figure 19:
FIG. 19 illustrates an exemplary alpha mask image after repeated updates.

However, the region illustrated in gray within which unknown pixels are defined grows larger as the processing in the above steps S5 to S9 is repeated. For example, approximately 20 repetitions yields a trimap image like that shown in FIG. 18. If the processing is repeated a specified number of times in this way, the alpha mask image A used to update the trimap image T becomes like that shown by way of example in FIG. 19. On the basis of the alpha mask image A in FIG. 19, the trimap image T exhibits almost no variance after being updated. In this way, once the trimap image reaches a state of invariance across updates, the range of intermediate transparency α values where pixels belong to neither the foreground object image nor the background image (i.e., the range defining unknown pixels in the trimap image T) becomes acceptable.

It thus becomes possible to define an optimal unknown region as a result of defining a trimap image T, generating an alpha mask image A by robust matting of the trimap image T, repeating a process to update the trimap image T to a trimap image T' on the basis of the alpha mask image A and edge flow vectors, and finally updating the trimap image T.

When expanding the range of unknown pixels, the Euclidean distance (for a circle) or the Manhattan distance (for a square) extending from the center is often used for typical region expansion by a fixed quantity with respect to a target pixel.

However, it is preferable to conduct expansion weighted in the direction of the edge flow vectors in the case of objects having complex edges at their contours. For this reason, in the above process, elliptical sampling having an inflated distribution in one direction is used.

In addition, the above describes an example wherein the update process is repeated until the trimap image T and the updated trimap image T' become identical or nearly identical, or alternatively, until the processing is executed a specified number of times. However, if shortened calculation time is more important than image quality, for example, then the specified number of times to execute the update process may be set to a low number. For example, the specified number of times may be 1.

For example, if the update process is executed once, then the trimap image corresponds to the processing result from step S3 in FIG. 6, and thus a range of unknown pixels having a uniform width is set at the boundary between the foreground object image and the background image in the binary mask image B. In this case, since the width is uniform, it is unlikely that a high-quality trimap image will be generated, but it is possible to reduce the calculation time.

Furthermore, in the above description, the edge tangent flow vectors of the alpha mask image A are used when expanding the width of unknown pixels in the trimap image T. The vectors are used such that the semi-major axis of the weighted elliptical range lies along the vector orientation. In so doing, the unknown region is expanded with a weight applied in the vector direction. However, in addition to the above, the unknown region may also be expanded by defining a range weighted perpendicular to the boundary between the foreground object image and the background image in the binary mask image B.

Moreover, the above edge tangent flow vectors may also be derived from an RGB or similar input image, rather than from the alpha mask image A.

The edge tangent flow vectors may also be derived from a likelihood map image for the foreground object image and the background image, rather than from the alpha mask image A. The likelihood map image referred to herein can be obtained as an intermediate result of graph cut processing, for example, and is a map containing values indicating whether each pixel in an input image is likely to belong to the foreground object image or the background image (see C. Rother et al.).

The foregoing describes an example wherein the target pixel is updated with a pixel label of −1 when its transparency α is determined to be greater than a minimum value Th_min and less than a maximum value Th_max in step S35 of FIG. 10. However, label of the target pixel may also be updated in addition to the above, such that the label is set to 0 when the transparency α is less than the minimum value Th_min, and set to 1 when the transparency α is greater than the maximum value Th_max.

The foregoing also describes an example wherein a trimap image T with a comparatively narrow width is generated in an initial stage, and then the width is repeatedly expanded. However, in the initial trimap image T generation process corresponding to step S3, the unknown region may take a comparatively broad width, and the trimap image T may then be updated such that the unknown region is repeatedly reduced. In other words, the labels of unknown pixels not contained in the above expanded range may be updated from −1 (the label for the unknown region) to 0 (the label for the background image region) or 1 (the label for the foreground object image region), with the process being repeated so as to gradually reduce the expanded region.

Furthermore, while in the above description the binary mask image B is used as the input image I, a many-valued label image may be input instead of a binary image. The many-valued label image may apply labels as serial values such as the integers 0, 1, 2, . . . , for example, and may be divided into a plurality of regions. If the input image is a many-valued label image like the above, then the unknown region may be defined with the boundaries of the binary mask image taken to be the boundaries formed by assembling all regions of the many-valued label image.

If the input image is a many-valued label image, the image may be thought of as containing two regions when updating the trimap image, wherein one of the many-valued labels is taken to represent the foreground object image, and all other values are taken to represent the background image. In other words, alpha matting may be applied to the image, with $\alpha=1$ being set for the transparency of pixels in the foreground object image, and $\alpha=0$ being set for the transparency of pixels in the background image. The result may then be used to expand the unknown region.

The expansion of the range of unknown pixels may be achieved by repeating the above trimap image update, repeated such that all of the many-valued labels are treated as pixels belonging to the foreground object image. If the input is a many-valued label image as described above, then the trimap image yielded as the output image may, for example, be an image that contains the regions defined by the labels having serial integer values as described above, in addition to another, unknown region labeled −1.

Additionally, the user may also generate a simple trimap image by manual input, with the comparatively low-quality trimap image thus generated being used as the initial trimap image. A high-quality trimap image may then be generated by repeatedly executing the trimap image update process described earlier. In other words, as described in the present embodiment as the processing in steps S5 to S9, an expansion magnitude and direction may be determined by edge flow vectors for the range of unknown pixels in the low-quality trimap image T. The trimap image may then be updated on the basis of the expansion magnitude and direction, thereby enabling the creation of a high-quality trimap.

According to an embodiment of the present invention thus described, a trimap image can be generated from a binary mask image having a foreground object image and a background image defined therein. The generated trimap image is made up of pixels belonging to a foreground object image, pixels belonging to a background image, as well as unknown pixels, and is optimal for the configuration of an alpha mask image.

As a result, a high-quality trimap image (i.e., a 3-value image) can be easily generated from a binary mask image (i.e., a 2-value image), thereby making it possible to easily generate an alpha mask image by alpha matting of the generated 3-value image.

The series of information processes described in the foregoing can also be executed by means of hardware or software. If the series of processes are to be executed by means of software, then a program constituting such software may be installed onto a computer built into specialized hardware. Alternatively, the program may be installed from a recording medium onto a general-purpose personal computer or similar device able to perform various functions by installing various programs thereon.

Figure 20:
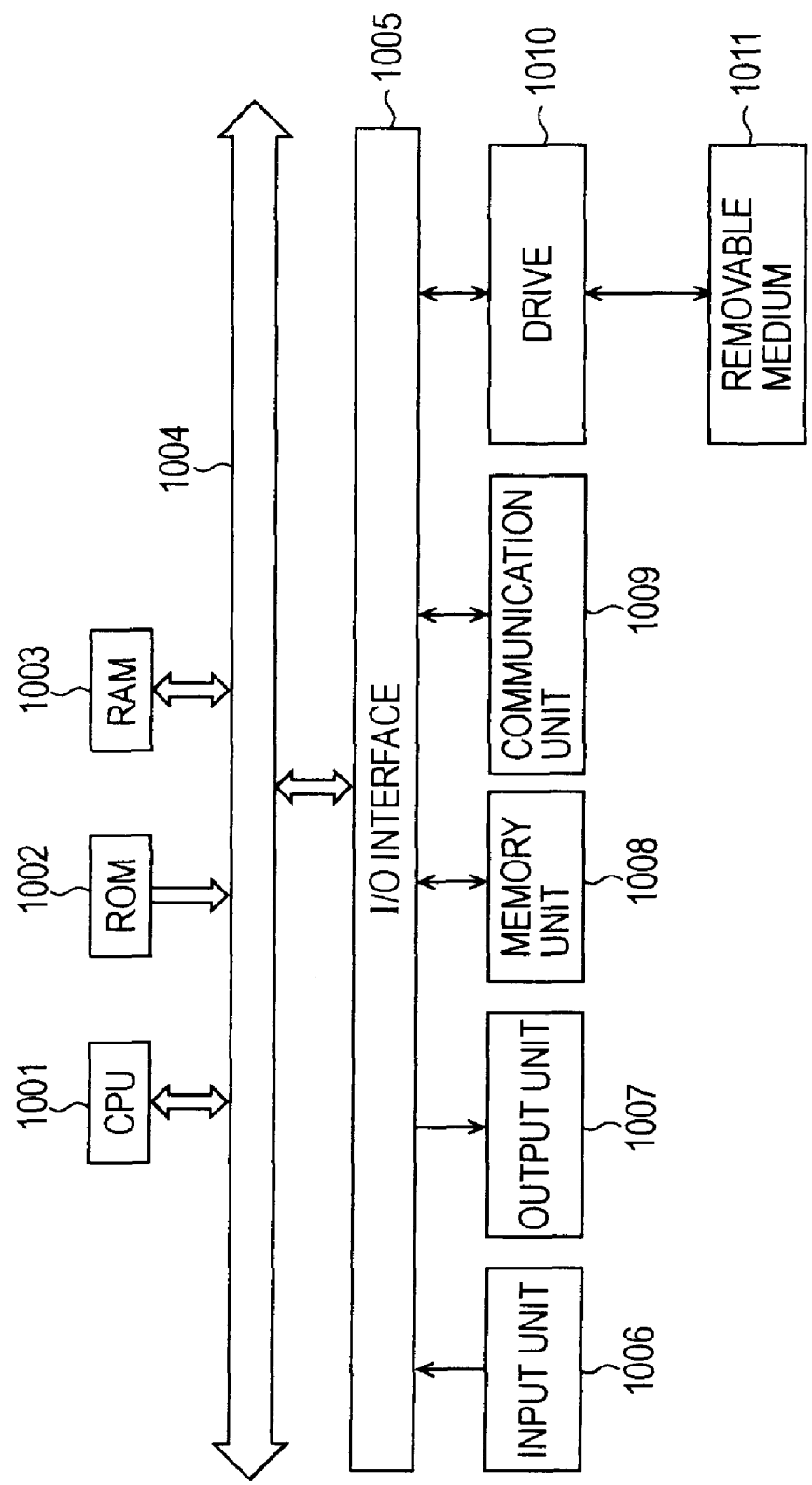
FIG. 20 is a diagram for explaining an exemplary configuration of a personal computer.

FIG. 20 illustrates an exemplary configuration of a general-purpose personal computer. The personal computer houses a CPU (central processing unit) 1001. The CPU 1001 is connected to an input/output interface 1005 via a bus 1004. Connected to the bus 1004 are ROM (read-only memory) 1002 and RAM (random access memory) 1003.

The input/output interface 1005 is connected to: an input unit 1006 made up of input devices, such as a keyboard and mouse, whereby a use inputs operational commands; an output unit 1007 that outputs images of a processing interface screen or processing results to a display device; a memory unit 1008 made up of a hard disk drive or similar device that stores programs and various data; and a communication unit 1009 made up of a LAN (local area network) adapter or similar device that executes communication processing via a network typified by the Internet. In addition, also connected is a drive 1010 that reads and writes data to a removable medium 1011 such as a magnetic disk (including flexible disks), an optical disc (including CD-ROMs (Compact Disc Read-Only Memory) and DVDs (Digital Versatile Discs)), a magneto-optical disc (including MDs (Mini Discs)), or semiconductor memory.

The above program is stored in the ROM 1002, or alternatively, is read from a removable medium 1011 such as a magnetic disk, optical disc, magneto-optical disc, or semiconductor memory, and installed to the memory unit 1008. The CPU 1001 then loads the program from the ROM 1002 or the removable medium 1008 into the RAM 1003 and executes various processing in accordance with the program. As appropriate, the RAM 1003 also stores data or other information used in the execution of the various processing by the CPU 1001.

It should also be appreciated that the steps stated in the program stored in the recording medium are not limited to being executed in a time series following the order of the processes described in the present specification, but may also be executed in parallel or individually.

The present application contains subject matter related to that disclosed in Japanese Priority Patent Application JP 2008-229835 filed in the Japan Patent Office on Sep. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    3-value image generating means for generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region;
    ratio image generating means for generating a ratio image from the input image and the 3-value image, wherein the ratio image is made up of a fourth value that indicates, on a per-pixel basis, the ratio of the first value;
    updating means for updating the 3-value image by defining a predetermined range near a pixel in the 3-value image that corresponds to a pixel in the ratio image whose fourth value is greater than a minimum value and less than a maximum value, and setting all pixels within the defined range to the third value;

determining means for determining whether or not the 3-value image updated by the updating means is identical or nearly identical to the 3-value image before being updated by the updating means; and output means for outputting the updated 3-value image if it is determined that the 3-value image updated by the updating means is identical or nearly identical to the 3-value image before being updated by the updating means.

2. The image processing apparatus according to claim 1, further comprising:

expansion amount defining means for defining, on a per-pixel basis, a range near a pixel in the 3-value image that corresponds to a pixel in the ratio image whose fourth value is greater than a minimum value and less than a maximum value, the range being defined in the form of an expansion amount;

wherein the updating means updates the 3-value image by setting all pixels within a predetermined range to the third value, the predetermined range being that defined by the expansion amount near a pixel in the 3-value image that corresponds to a pixel in the ratio image whose fourth value is greater than a minimum value and less than a maximum value.

3. The image processing apparatus according to claim 1, further comprising:

expansion direction defining means for defining, on a per-pixel basis, a range near a pixel in the 3-value image that corresponds to a pixel in the ratio image whose fourth value is greater than a minimum value and less than a maximum value, the range being defined in the form of an expansion direction;

wherein the updating means updates the 3-value image by setting all pixels within a predetermined range to the third value, the predetermined range being that defined by the expansion direction near a pixel in the 3-value image that corresponds to a pixel in the ratio image whose fourth value is greater than a minimum value and less than a maximum value.

4. The image processing apparatus according to claim 1, further comprising:

expansion vector defining means for defining, on a per-pixel basis, a range near a pixel in the 3-value image that corresponds to a pixel in the ratio image whose fourth value is greater than a minimum value and less than a maximum value, the range being defined in the form of an expansion vector made up of an expansion direction and an expansion amount;

wherein the updating means updates the 3-value image by setting all pixels within a predetermined range to the third value, the predetermined range being that defined by the expansion vector near a pixel in the 3-value image that corresponds to a pixel in the ratio image whose fourth value is greater than a minimum value and less than a maximum value.

5. The image processing apparatus according to claim 4, wherein the expansion direction of the expansion vector includes the orientation of an edge tangent flow vector from the input image or the ratio image, or alternatively, a direction normal to a boundary formed by a pixel taking a predetermined ratio in the ratio image.

6. The image processing apparatus according to claim 1, wherein if it is determined that the 3-value image updated by the updating means is identical or nearly identical to the 3-value image before being updated by the updating means, then the ratio image generating means generates a ratio image from the 3-value image updated by the updating means and the input image, wherein the ratio image is made up of a fourth value that indicates, on a per-pixel basis, the ratio of the first value, and the updating means sets all pixels to the third value within a predetermined range near a pixel in the 3-value image that corresponds to a pixel in the ratio image whose fourth value is greater than a minimum value and less than a maximum value.

7. The image processing apparatus according to claim 6, wherein until it is determined that the 3-value image updated by the updating means is identical or nearly identical to the 3-value image before being updated by the updating means, the ratio image generating means and the updating means repeat the processing whereby a ratio image is generated from the 3-value image updated by the updating means and the input image, wherein the ratio image is made up of a fourth value that indicates, on a per-pixel basis, the ratio of the first value, and all pixels are set to the third value within a predetermined range near a pixel in the 3-value image that corresponds to a pixel in the ration image whose fourth value is greater than a minimum value and less than a maximum value.

8. An image processing method for an image processing apparatus, the image processing apparatus including 3-value image generating means for generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region, ratio image generating means for generating a ratio image from the input image and the 3-value image, wherein the ratio image is made up of a fourth value that indicates, on a per-pixel basis, the ratio of the first value, updating means for updating the 3-value image by defining a predetermined range near a pixel in the 3-value image that corresponds to a pixel in the ratio image whose fourth value is greater than a minimum value and less than a maximum value, and setting all pixels within the defined range to the third value, determining means for determining whether or not the 3-value image updated by the updating means is identical or nearly identical to the 3-value image before being updated by the updating means, and output means for outputting the updated 3-value image if it is determined that the 3-value image updated by the updating means is identical or nearly identical to the 3-value image before being updated by the updating means, the image processing method comprising the steps of:

by means of the 3-value image generating means, generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region;

by means of the ratio image generating means, generating a ratio image from the input image and the 3-value image, wherein the ratio image is made up of a fourth value that indicates, on a per-pixel basis, the ratio of the first value;

by means of the updating means, updating the 3-value image by defining a predetermined range near a pixel in the 3-value image that corresponds to a pixel in the ratio image whose fourth value is greater than a minimum value and less than a maximum value, and setting all pixels within the defined range to the third value;

by means of the determining means, determining whether or not the 3-value image updated by the updating means is identical or nearly identical to the 3-value image before being updated by the updating means; and by means of the output means, outputting the updated 3-value image if it is determined that the 3-value image updated by the updating means is identical or nearly identical to the 3-value image before being updated by the updating means.

9. A non-transitory computer-readable storage medium encoded with instructions which, when executed on a processor, cause processing to be executed on a computer that controls an image processing apparatus, the image processing apparatus including 3-value image generating means for generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region, ratio image generating means for generating a ratio image from the input image and the 3-value image, wherein the ratio image is made up of a fourth value that indicates, on a per-pixel basis, the ratio of the first value, updating means for updating the 3-value image by defining a predetermined range near a pixel in the 3-value image that corresponds to a pixel in the ratio image whose fourth value is greater than a minimum value and less than a maximum value, and setting all pixels within the defined range to the third value, determining means for determining whether or not the 3-value image updated by the updating means is identical or nearly identical to the 3-value image before being updated by the updating means, and output means for outputting the updated 3-value image if it is determined that the 3-value image updated by the updating means is identical or nearly identical to the 3-value image before being updated by the updating means, the processing of the program comprising the steps of:

by means of the 3-value image generating means, generating a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region;

by means of the ratio image generating means, generating a ratio image from the input image and the 3-value image, wherein the ratio image is made up of a fourth value that indicates, on a per-pixel basis, the ratio of the first value;

by means of the updating means, updating the 3-value image by defining a predetermined range near a pixel in the 3-value image that corresponds to a pixel in the ratio image whose fourth value is greater than a minimum value and less than a maximum value, and setting all pixels within the defined range to the third value;

by means of the determining means, determining whether or not the 3-value image updated by the updating means is identical or nearly identical to the 3-value image before being updated by the updating means; and by means of the output means, outputting the updated 3-value image if it is determined that the 3-value image updated by the updating means is identical or nearly identical to the 3-value image before being updated by the updating means.

10. An image processing apparatus, comprising:

a 3-value image generator configured to generate a 3-value image made up of first through third values from a 2-value image, wherein the 2-value image is made up of a first value indicating, on a per-pixel basis, a foreground image region in an input image, as well as a second value similarly indicating a background image region, and wherein the third value of the 3-value image indicates an unknown region defined differently from both the foreground image region and the background image region such that the unknown region is defined having a predetermined width at the boundary between the foreground image region and the background image region;

a ratio image generator configured to generate a ratio image from the input image and the 3-value image, wherein the ratio image is made up of a fourth value that indicates, on a per-pixel basis, the ratio of the first value;

an updater configured to update the 3-value image by defining a predetermined range near a pixel in the 3-value image that corresponds to a pixel in the ratio image whose fourth value is greater than a minimum value and less than a maximum value, and setting all pixels within the defined range to the third value;

a determining unit configured to determine whether or not the 3-value image updated by the updater is identical or nearly identical to the 3-value image before being updated by the updater; and an output unit configured to output the updated 3-value image if it is determined that the 3-value image updated by the updater is identical or nearly identical to the 3-value image before being updated by the updater.

11. The image processing apparatus of claim 10, further comprising:
  an expansion amount unit configured to define, on a per-pixel basis, a range near a pixel in the 3-value image that corresponds to a pixel in the ratio image whose fourth value is greater than a minimum value and less than a maximum value, the range being defined in the form of an expansion amount;
  wherein the updater is further configured to update the 3-value image by setting all pixels within a predetermined range to the third value, the predetermined range being that defined by the expansion amount near a pixel in the 3-value image that corresponds to a pixel in the ratio image whose fourth value is greater than a minimum value and less than a maximum value.

12. The image processing apparatus of claim 10, further comprising:
  an expansion direction unit configured to define, on a per-pixel basis, a range near a pixel in the 3-value image that corresponds to a pixel in the ratio image whose fourth value is greater than a minimum value and less than a maximum value, the range being defined in the form of an expansion direction;
  wherein the updater if further configured to update the 3-value image by setting all pixels within a predetermined range to the third value, the predetermined range being that defined by the expansion direction near a pixel in the 3-value image that corresponds to a pixel in the ratio image whose fourth value is greater than a minimum value and less than a maximum value.

13. The image processing apparatus of claim 10, further comprising:
  an expansion vector defining unit configured to define, on a per-pixel basis, a range near a pixel in the 3-value image that corresponds to a pixel in the ratio image whose fourth value is greater than a minimum value and less than a maximum value, the range being defined in the form of an expansion vector made up of an expansion direction and an expansion amount;
  wherein the updater is further configured to update the 3-value image by setting all pixels within a predetermined range to the third value, the predetermined range being that defined by the expansion vector near a pixel in the 3-value image that corresponds to a pixel in the ratio image whose fourth value is greater than a minimum value and less than a maximum value.

14. The image processing apparatus of claim 13, wherein the expansion direction of the expansion vector includes the orientation of an edge tangent flow vector from the input image or the ratio image, or alternatively, a direction normal to a boundary formed by a pixel taking a predetermined ratio in the ratio image.

15. The image processing apparatus of claim 10, wherein
  if it is determined that the 3-value image updated by the updater is identical or nearly identical to the 3-value image before being updated by the updater, then
  the ratio image generator generates a ratio image from the 3-value image updated by the updater and the input image, wherein the ratio image is made up of a fourth value that indicates, on a per-pixel basis, the ratio of the first value, and
  the updater sets all pixels to the third value within a predetermined range near a pixel in the 3-value image that corresponds to a pixel in the ratio image whose fourth value is greater than a minimum value and less than a maximum value.

16. The image processing apparatus of claim 15, wherein
  until it is determined that the 3-value image updated by the updater is identical or nearly identical to the 3-value image before being updated by the updater,
  the ratio image generator and the updater repeat the processing whereby
    a ratio image is generated from the 3-value image updated by the updater and the input image, wherein the ratio image is made up of a fourth value that indicates, on a per-pixel basis, the ratio of the first value, and
    all pixels are set to the third value within a predetermined range near a pixel in the 3-value image that corresponds to a pixel in the ration image whose fourth value is greater than a minimum value and less than a maximum value.

17. The image processing method of claim 8, the image processing apparatus further including expansion amount defining means for defining, on a per-pixel basis, a range near a pixel in the 3-value image that corresponds to a pixel in the ratio image whose fourth value is greater than a minimum value and less than a maximum value, the range being defined in the form of an expansion amount, the method further comprising:
  by means of the updating means, updating the 3-value image by setting all pixels within a predetermined range to the third value, the predetermined range being that defined by the expansion amount near a pixel in the 3-value image that corresponds to a pixel in the ratio image whose fourth value is greater than a minimum value and less than a maximum value.

18. The image processing method of claim 8, the image processing apparatus further including expansion direction defining means for defining, on a per-pixel basis, a range near a pixel in the 3-value image that corresponds to a pixel in the ratio image whose fourth value is greater than a minimum value and less than a maximum value, the range being defined in the form of an expansion direction, the method further comprising:
  by means of the updating means, updating the 3-value image by setting all pixels within a predetermined range to the third value, the predetermined range being that defined by the expansion direction near a pixel in the 3-value image that corresponds to a pixel in the ratio image whose fourth value is greater than a minimum value and less than a maximum value.

19. The image processing method of claim 1, the image process apparatus further including expansion vector defining means for defining, on a per-pixel basis, a range near a pixel in the 3-value image that corresponds to a pixel in the ratio image whose fourth value is greater than a minimum value and less than a maximum value, the range being defined in the form of an expansion vector made up of an expansion direction and an expansion amount, the method further comprising:
  by the updating means, updating the 3-value image by setting all pixels within a predetermined range to the third value, the predetermined range being that defined by the expansion vector near a pixel in the 3-value image that corresponds to a pixel in the ratio image whose fourth value is greater than a minimum value and less than a maximum value.

20. The image processing method of claim 19, wherein the expansion direction of the expansion vector includes the orientation of an edge tangent flow vector from the input image or the ratio image, or alternatively, a direction normal to a boundary formed by a pixel taking a predetermined ratio in the ratio image.

* * * * *